(12) United States Patent
Shimizu et al.

(10) Patent No.: US 6,341,002 B1
(45) Date of Patent: Jan. 22, 2002

(54) LIQUID CRYSTAL DISPLAY DEVICE

(75) Inventors: Masahiro Shimizu; Yasuhisa Itoh; Masumi Kubo, all of Nara-ken (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/418,322

(22) Filed: Oct. 14, 1999

(30) Foreign Application Priority Data

Oct. 15, 1998 (JP) .......................................... 10-294311
Mar. 24, 1999 (JP) .......................................... 11-080586

(51) Int. Cl.$^7$ ............................................ G02F 1/1335
(52) U.S. Cl. ........................ 349/119; 349/180; 349/181
(58) Field of Search ................................. 349/114, 113, 349/117, 119, 143, 179, 181, 180

(56) References Cited

U.S. PATENT DOCUMENTS 6,281,952 B1 * 8/2001 Okamoto et al. ............ 349/117
6,295,109 B1 * 9/2001 Kubo et al. .................. 349/119

FOREIGN PATENT DOCUMENTS

JP          7-333598 A     12/1995

* cited by examiner

Primary Examiner—Toan Ton
Assistant Examiner—Tai V. Duong
(74) Attorney, Agent, or Firm—Nixon & Vanderhye, P.C.

(57) ABSTRACT

A liquid crystal display device, includes: a first substrate, a second substrate, a liquid crystal layer interposed therebetween, and a plurality of pixel regions defined by a pair of electrodes for applying a voltage to the liquid crystal layer. Each of the plurality of pixel regions includes a reflection region and a transmission region, and the liquid crystal layer is made of a liquid crystal material having positive dielectric anisotropy. A first polarizing element is provided on the first substrate opposite to the liquid crystal layer; a second polarizing element is provided on the second substrate opposite to the liquid crystal layer; a first phase difference compensator is provided between the first polarizing element and the liquid crystal layer; and a second phase difference compensator is provided between the second polarizing element and the liquid crystal layer. A twist angle $\theta_t$ of the liquid crystal layer is in a range of 0° to 90°. Retardation Rd and the twist angle $\theta_t$ in a visible light region of the liquid crystal layer in the reflection region are in ranges within curves respectively represented by the following Formulae (1) and (2), and Formulae (3) and (4), in ranges within curves respectively represented by the following Formulae (5) and (6) and Formulae (7) and (8) at the twist angle $\theta_t$ in a range of $0° \leq \theta_t \leq 54.3°$, and in ranges within curves respectively represented by prescribed Formulae.

7 Claims, 18 Drawing Sheets

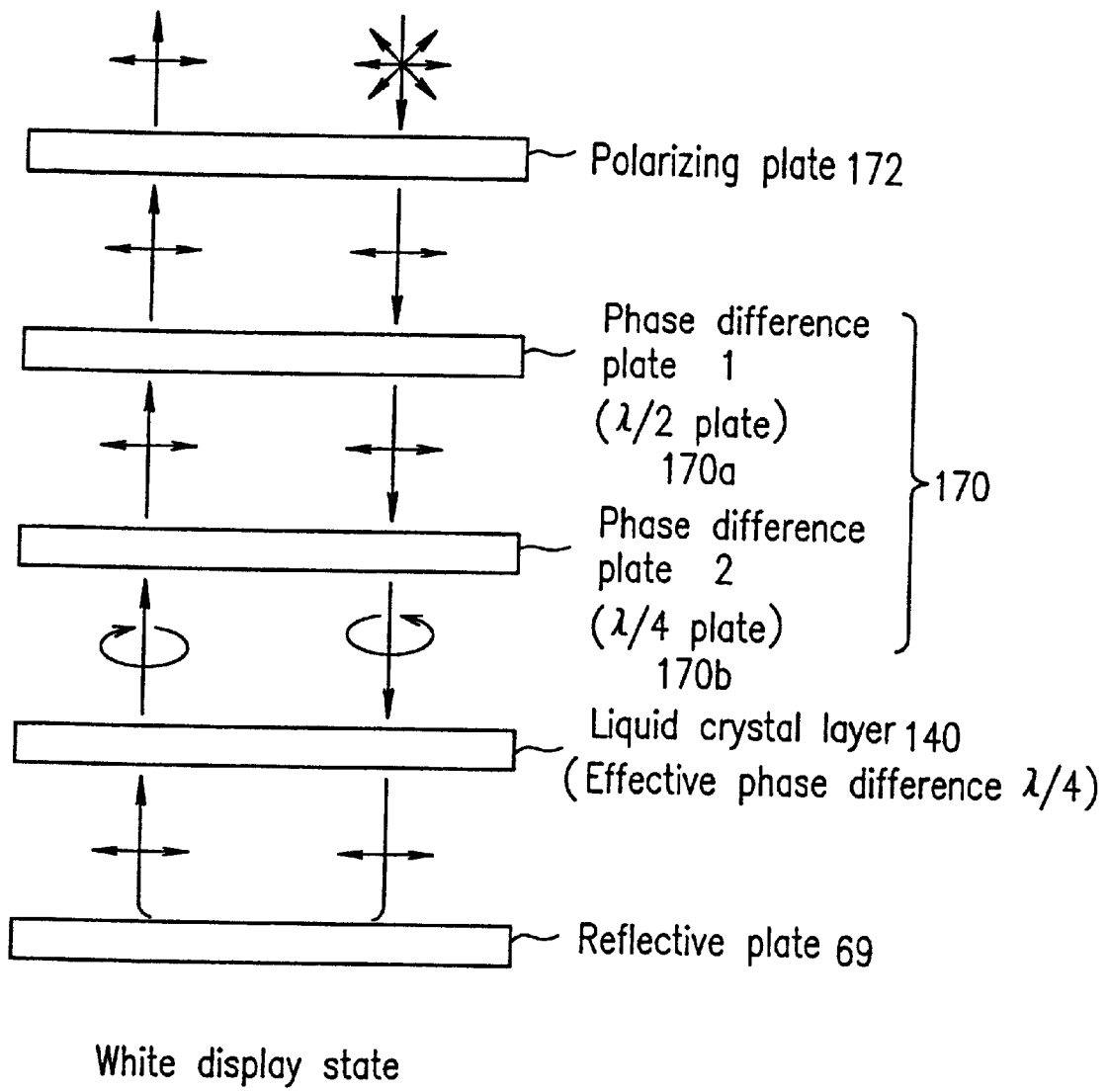

Black display state

Phase-delay axis of a λ/4 plate is provided in a direction parallel to a phase-delay axis of a liquid crystal layer Phase-delay axis of a λ/4 plate is provided in a direction vertical to a phase-delay axis of a liquid crystal layer

LIQUID CRYSTAL DISPLAY DEVICE

BACKGROUND OF THE INVENTION

1. Field of the Invention

The present invention relates to a liquid crystal display device and, in particular, to a reflection/transmission type liquid crystal display device capable of performing a display both in a reflection mode and a transmission mode.

2. Description of the Related Art

Conventionally, there have been a reflection type liquid crystal display device utilizing ambient light, a transmission type liquid crystal display device utilizing backlight, and a semi-transmission type liquid crystal display device equipped with a half mirror and a backlight.

In a reflection type liquid crystal display device, a display becomes less visible under dim environment, whereas in a transmission type liquid crystal display device, a display becomes hazy under strong ambient light (e.g., under outdoor sunlight). As a liquid crystal display device capable of functioning in both modes so as to perform a satisfactory display under any environment, a semi-transmission type liquid crystal display device is disclosed by Japanese Laid-Open Publication No. 7-333598.

However, the above-mentioned conventional semi-transmission type liquid crystal display device has the following problems.

The conventional semi-transmission type liquid crystal display device uses a half mirror in place of a reflective plate used in a reflection type liquid crystal display device, and has a minute transmission region (e.g., minute holes in a metal thin film) in a reflection region, thereby performing a display by utilizing transmitted light as well as reflected light. Since reflected light and transmitted light used for a display pass through the same liquid crystal layer, an optical path of reflected light becomes twice that of transmitted light, which causes a large difference in retardation of the liquid crystal layer with respect to reflected light and transmitted light. Thus, a satisfactory display cannot be obtained. Furthermore, a display in a reflection mode and a display in a transmission mode are superimposed on each other, so that the respective displays cannot be separately optimized. This results in difficulty in performing a color display, and causes a blurred display.

SUMMARY OF THE INVENTION

A liquid crystal display device according to the present invention, includes: a first substrate, a second substrate, a liquid crystal layer interposed between the first substrate and the second substrate, and a plurality of pixel regions defined by a pair of electrodes for applying a voltage to the liquid crystal layer, wherein each of the plurality of pixel regions includes a reflection region and a transmission region, and the liquid crystal layer is made of a liquid crystal material having positive dielectric anisotropy, the device further including: a first polarizing element provided on the first substrate opposite to the liquid crystal layer; a second polarizing element provided on the second substrate opposite to the liquid crystal layer; a first phase difference compensator provided between the first polarizing element and the liquid crystal layer; and a second phase difference compensator provided between the second polarizing element and the liquid crystal layer, a twist angle $\theta_t$ of the liquid crystal layer being in a range of 0° to 90°, wherein retardation Rd and the twist angle $\theta_t$ in a visible light region of the liquid crystal layer in the reflection region are in ranges within curves respectively represented by the following Formulae (1) and (2), and Formulae (3) and (4), in ranges within curves respectively represented by the following Formulae (5) and (6) and Formulae (7) and (8) at the twist angle $\theta_t$ in a range of $0° \leq \theta_t \leq 54.3°$, and in ranges within curves respectively represented by the following Formulae (5) and (8) at the twist angle $\theta_t$ in a range of $54.3° < \theta_t \leq 90°$, and wherein the retardation Rd and the twist angle $\theta_t$ in a visible light region of the liquid crystal layer in the transmission region are in ranges within curves respectively represented by the following Formulae (9) and (10) and Formulae (11) and (12):

$$Rd = -0.0043 \cdot \theta_t^2 - 0.065 \cdot \theta_t + 1011.8 \tag{1}$$

$$Rd = -0.0089 \cdot \theta_t^2 + 0.1379 \cdot \theta_t + 914.68 \tag{2}$$

$$Rd = -0.0015 \cdot \theta_t^2 - 0.1612 \cdot \theta_t + 737.29 \tag{3}$$

$$Rd = -0.0064 \cdot \theta_t^2 - 0.0043 \cdot \theta_t + 640.65 \tag{4}$$

$$Rd = -0.0178 \cdot \theta_t^2 + 0.2219 \cdot \theta_t + 458.92 \tag{5}$$

$$Rd = -0.0405 \cdot \theta_t^2 + 0.4045 \cdot \theta_t + 364.05 \tag{6}$$

$$Rd = 0.0347 \cdot \theta_t^2 - 0.4161 \cdot \theta_t + 186.53 \tag{7}$$

$$Rd = 0.0098 \cdot \theta_t^2 - 0.1912 \cdot \theta_t + 89.873 \tag{8}$$

$$Rd = -0.0043 \cdot \theta_t^2 - 0.065 \cdot \theta_t + 995.66 \tag{9}$$

$$Rd = -0.0058 \cdot \theta_t^2 - 0.0202 \cdot \theta_t + 665.8 \tag{10}$$

$$Rd = -0.0248 \cdot \theta_t^2 + 0.6307 \cdot \theta_t + 439.58 \tag{11}$$

$$Rd = 0.0181 \cdot \theta_t^2 - 0.6662 \cdot \theta_t + 109.51 \tag{12}$$

In one embodiment of the present invention, the retardation Rd is in a range within the curves respectively represented by Formulae (7) and (8) at the twist angle $\theta_t$ in the reflection region in a range of $0° \leq \theta_t \leq 54.3°$, and in a range within the curves respectively represented by Formulae (5) and (8) at the twist angle $\theta_t$ in the reflection region in a range of $54.3° < \theta_t \leq 90°$, and the retardation is in a range within the curves respectively represented by Formulae (11) and (12) at the twist angle $\theta_t$ in the transmission region in a range of $0° \leq \theta_t \leq 90°$.

In another embodiment of the present invention, the reflection region and the transmission region include a liquid crystal layer made of the same liquid crystal material, and a thickness of the liquid crystal layer in the reflection region is smaller than a thickness of the liquid crystal layer in the transmission region.

In another embodiment of the present invention, the first phase difference compensator has a first phase difference plate, the twist angle $\theta_t$ of the liquid crystal layer is 0°, the retardation Rd of the reflection region is 90 nm $\leq$ Rd $\leq$ 187 nm, the retardation Rd of the transmission region is 110 nm $\leq$ Rd $\leq$ 440 nm, and the retardation Rd of the first phase difference plate is 30 nm $\leq$ Rd $\leq$ 250 nm.

In another embodiment of the present invention, the first phase difference compensator further has a second phase difference plate, and the retardation Rd of the second phase difference plate is in a range of 220 nm $\leq$ Rd $\leq$ 330 nm.

In another embodiment of the present invention, the second phase difference compensator has a third phase difference plate, and the retardation Rd of the third phase difference plate is in a range of 120 $\leq$ Rd $\leq$ 150 nm.

In another embodiment of the present invention, the second phase difference compensator further has a fourth phase difference plate, and the retardation Rd of the fourth phase difference plate is in a range of 240 $\leq$ Rd $\leq$ 310 nm.

Hereinafter, the function of the present invention will be described. First, the terms used herein will be described. In a reflection/transmission liquid crystal display device, a region where a display is performed by using transmitted light is referred to as a transmission region, and a region where a display is performed by using reflected light is referred to as a reflection region. The transmission region and the reflection region respectively include a transparent electrode region and a reflective electrode region formed on a substrate and a liquid crystal layer interposed between a pair of substrates. The transparent electrode region and the reflective electrode region on the substrate respectively define two-dimensional areas of the reflection region and the transmission region. The transparent electrode region is typically defined by a transparent electrode. The reflective electrode region is defined by a reflective electrode or a combination of the transparent electrode and the reflective electrode.

The liquid crystal display device of the present invention has a reflection region and a transmission region per pixel region. Thus, retardation of the liquid crystal layer can be optimized independently in the reflection region and the transmission region. More specifically, by prescribing the retardation of the liquid crystal layer in the reflection region to be those which (hatched regions (including double-hatched regions) in FIG. 5) are within curves represented by Formulae (1) and (2), Formulae (3) and (4), Formulae (5) and (6), and Formulae (7) and (8), and by prescribing the retardation of the liquid crystal layer in the transmission region to be those which (hatched regions (including double-hatched regions) in FIG. 6) are within curves represented by Formulae (9) and (10) and Formulae (11) and (12), the brightness (reflectivity) in the reflection region can be set to be about 70% or more, and the brightness (reflectivity) in the transmission region can be prescribed to be about 30% or more.

It is preferable that the conditions of the retardation are satisfied with respect to a central wavelength (high visibility) of visible light of about 550 nm. Furthermore, it is more preferable that the conditions of the retardation are satisfied in the entire wavelength range (about 400 nm to about 800 nm) of visible light.

Furthermore, since the twist angle $\theta_t$ is in a range of about 0° to about 90°, the same twist angle can be obtained in both the reflection region and the transmission region having different thicknesses of the liquid crystal layer by single rubbing treatment. In order to render the twist angle different between the reflection region and the transmission region, rubbing is required to be conducted separately for two regions, which complicates a production process.

Furthermore, by prescribing the retardation Rd in a region within the curves represented by Formulae (7) and (8) at the twist angle $\theta_t$ of the reflection region in a range of $0° \leq \theta_t \leq 54.3°$, and in a region (double-hatched region in FIG. 5) within the curves represented by Formulae (5) and (8) at the twist angle $\theta_t$ of the reflection region in a range of $54.3° \leq \theta_t \leq 90°$, and by prescribing the retardation Rd in a region (double-hatched region in FIG. 6) within the curves represented by Formulae (11) and (12) at the twist angle $\theta_t$ of the transmission region in a range of $0° \leq \theta_t \leq 90°$, retardation of a liquid crystal layer in the reflection region and the transmission region becomes 0 in the presence of an applied voltage. If a black display is set to be performed at this time, a satisfactory black display is realized by applying the same voltage to the reflection region and the transmission region.

Furthermore, the above-mentioned condition corresponds to the case where a white region in which retardation is closest to 0 (i.e., the first peak from the lowest retardation side in FIGS. 7 and 8) is selected as a condition of realizing a white display. Thus, a gray-scale display is also satisfactorily performed. More specifically, in a gray-scale state in which a white display is changed to a black display, brightness (reflectivity and transmissivity) is monotonously decreased, so that a satisfactory gray-scale display is obtained. If a white display is performed by using the second peak from the lowest retardation side in FIGS. 7 and 8, the first peak is present in a region for a gray-scale display. Thus, a satisfactory gray-scale display cannot be performed.

When the liquid crystal layer in the transmission region and the reflection region are made of the same liquid crystal material, a structure and a production method will be simplified, compared with the case where the kind of a liquid crystal material is varied. It is effective to vary the thickness of the liquid crystal layer in the reflection region and the transmission region, so as to set different retardation in the reflection region and the transmission region. Furthermore, in order to match the length of an optical path with respect to light which contributes to a display in the reflection region with that in the transmission region, it is effective to prescribe the thickness of the liquid crystal layer in the transmission region to be larger than that in the reflection region. It is most preferable that the thickness of the liquid crystal layer in the transmission region is twice that in the reflection region.

If the first phase difference compensator has a first phase difference plate, the twist angle $\theta_t$ of the liquid crystal layer is 0°, the retardation Rd of the reflection region is 90 nm$\leq$Rd$\leq$187 nm, the retardation Rd of the transmission region is 110 nm$\leq$Rd$\leq$440 nm, and the retardation Rd of the first phase difference plate is 30 nm$\leq$Rd$\leq$250 nm, a bright display of a normally white mode can be realized in the reflection region with a high contrast ratio.

If the first phase difference compensator has a second phase difference plate as well as the first phase difference plate, and the retardation Rd of the second phase difference plate is in a range of 220 nm$\leq$Rd$\leq$330 nm, wavelength characteristics in the reflection region can be alleviated, so that a display with a higher contrast can be obtained.

If the second phase difference compensator has a third phase difference plate, and the retardation Rd of the third phase difference plate is in a range of 120 nm$\leq$Rd$\leq$150 nm, a dark display is optimized even in the transmission region, so that a display with a higher contrast can be obtained.

If the second phase difference compensator has a fourth phase difference plate as well as the third phase difference plate, and the retardation Rd of the fourth phase difference plate is in a range of 240 nm$\leq$Rd$\leq$310 nm, wavelength characteristics of the transmission region are alleviated, so that a display with a higher contrast can be obtained.

Thus, the invention described herein makes possible the advantages of providing a liquid crystal display device which has outstanding mass-productivity and is capable of performing a satisfactory display irrespective of the brightness of ambient light.

These and other advantages of the present invention will become apparent to those skilled in the art upon reading and understanding the following detailed description with reference to the accompanying figures.

BRIEF DESCRIPTION OF THE DRAWINGS

FIG. 2 shows a polarized state of light in each layer in the case where a white display is performed in a reflection region.

DESCRIPTION OF THE PREFERRED EMBODIMENTS

Figure 1A:
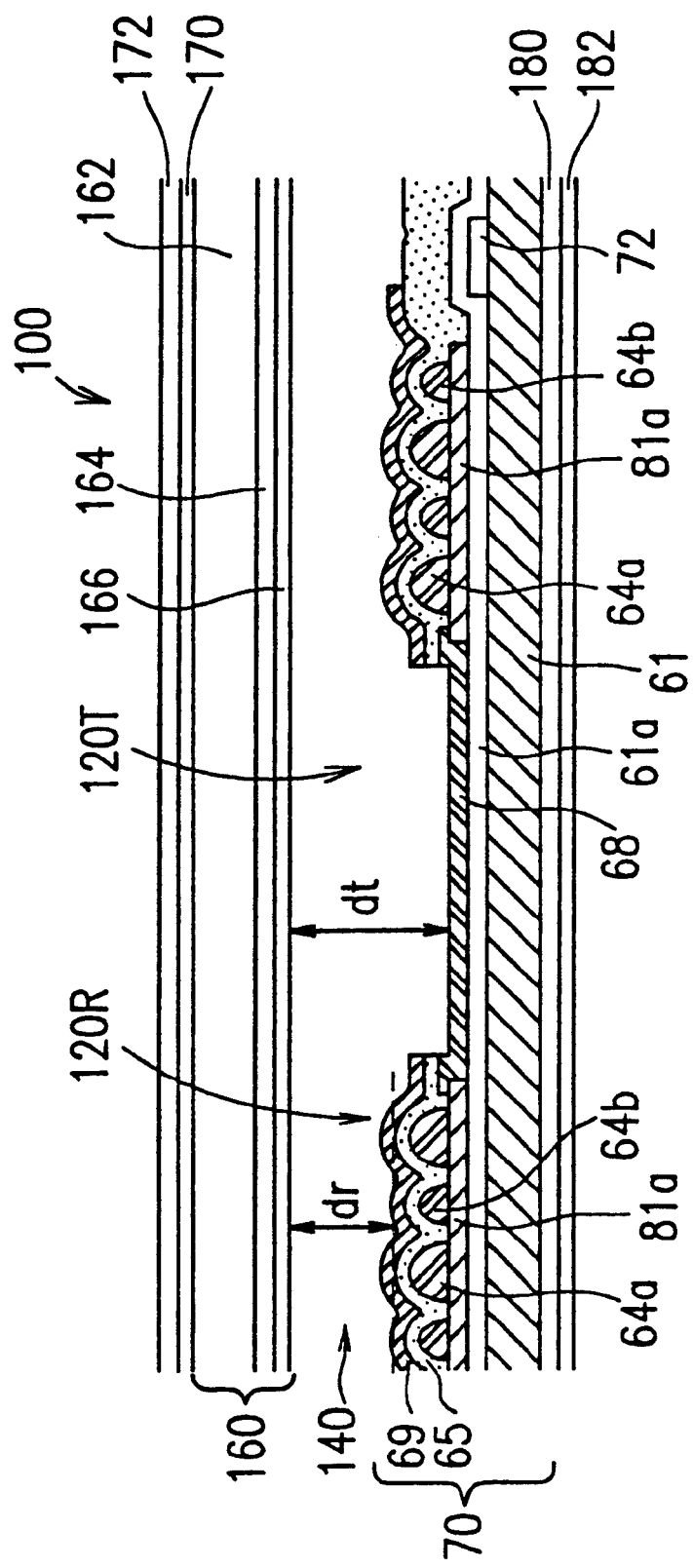
FIG. 1A is a partial cross-sectional view of a reflection/transmission type liquid crystal display device of an embodiment according to the present invention.
Figure 1B:
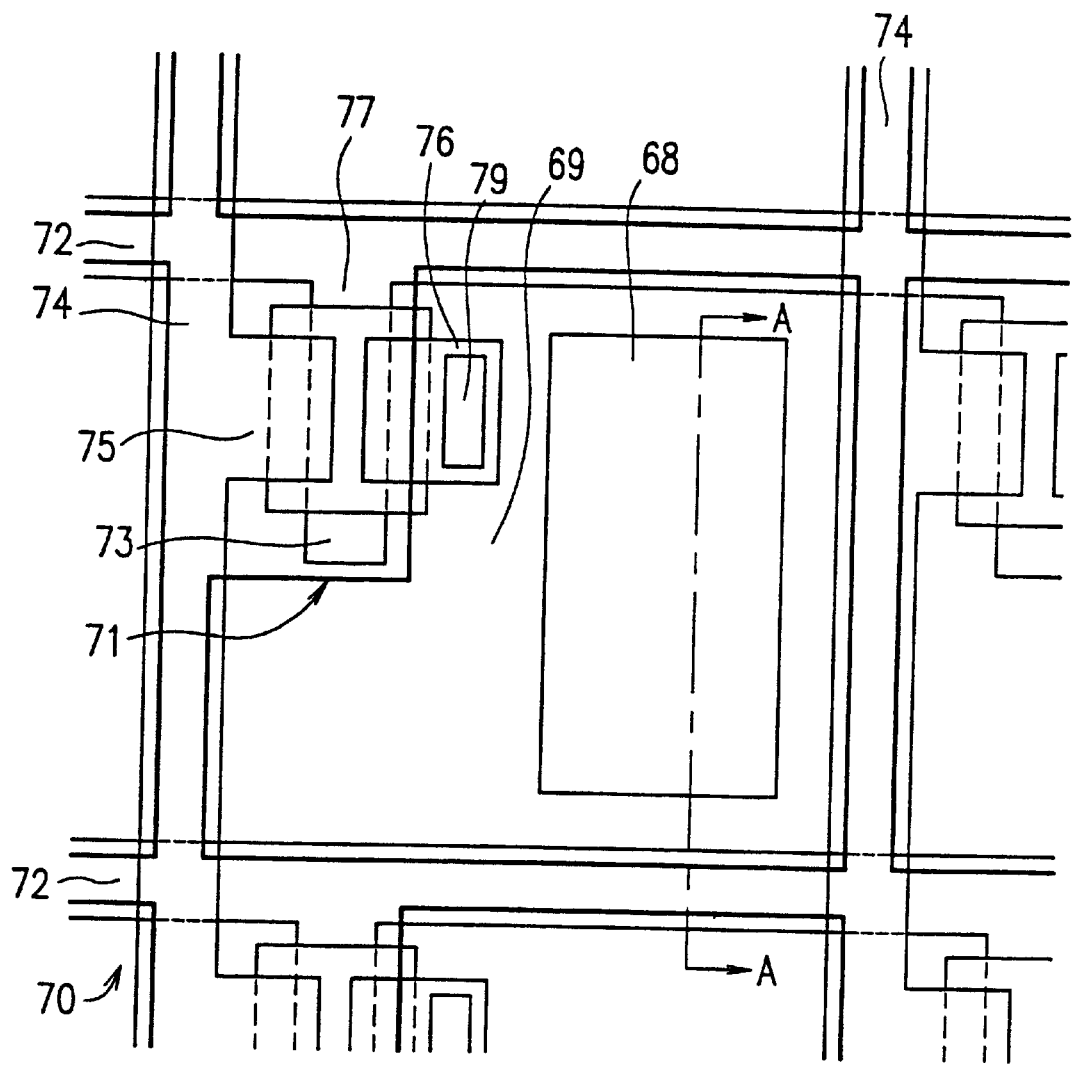
FIG. 1B is a plan view of an active matrix substrate in the liquid crystal display device.

FIG. 1A is a partial cross-sectional view of a reflection/transmission type liquid crystal display device 100 of an embodiment according to the present invention. FIG. 1B is a top view of an active matrix substrate 70 in the liquid crystal display device 100. FIG. 1A corresponds to a cross-sectional view taken along a line A—A in FIG. 1B.

As shown in FIG. 1A, the liquid crystal display device 100 includes an active matrix substrate 70, a counter substrate (color filter substrate) 160, and a liquid crystal layer 140 interposed therebetween. On the surfaces of the active matrix substrate 70 and the counter substrate 160 opposite to the liquid crystal layer 140, phase difference compensators 170 and 180 (a phase difference plate, a phase difference film, a layered structure thereof, etc.) are provided. Furthermore, polarizing elements (a polarizing plate, a polarizing film, etc.) 172 and 182 are provided on the outer surfaces of the phase difference compensators 170 and 180.

As shown in FIGS. 1A and 1B, in the active matrix substrate 70, a plurality of gate bus lines 72 (scanning lines) and a plurality of source bus lines 74 (signal lines) are provided so as to cross each other on an insulating glass substrate 61. In each rectangular region surrounded by each gate bus line 72 and each source bus line 74, a reflective electrode 69 made of a material having a high light reflectivity (e.g., Al, Ag, Ta) and a transparent electrode 68 made of a material having a high light transmissivity (e.g., ITO) are disposed. The reflective electrode 69 and the transparent electrode 68 form a pixel electrode. Below the reflective electrode 69, a higher convex portion 64a, a lower convex portion 64b, and a polymer resin film 65 formed so as to cover the convex portions are provided. The surface of the reflective electrode 69 has a continuous wave shape. The height of the convex portions may be constant.

The reflective electrode 69 is connected to a drain electrode 76 of a TFT 71 through a contact hole 79. The TFT 71 is formed of a semiconductor layer 77 disposed on a gate insulating film 61a which covers a gate electrode 73. The gate electrode 73 and the source electrode 75 of the TFT 71 are branched from the gate bus line 72 and the source bus line 74, respectively.

In the counter substrate 160, a color filter layer 164 and a transparent electrode 166 made of ITO or the like are formed on an insulating glass substrate 162. Horizontal alignment films (not shown) are formed on the surfaces of the active matrix substrate 70 and the counter substrate 160 on the liquid crystal layer 140 side. The surfaces of the active matrix substrate 70 and the counter substrate 160 on the liquid crystal layer 140 side are subjected to alignment treatment so as to have a desired twist angle by rubbing or the like after the alignment films are formed. A nematic liquid crystal material having positive dielectric anisotropy is used for the liquid crystal layer 140. Liquid crystal molecules in the liquid crystal layer 140 have a tilt angle of about 0.1° to about 5° with respect to the substrate surface by alignment treatment (rubbing, etc.) to the alignment films which are to be aligned in a horizontal direction. The liquid crystal molecules are aligned in a direction parallel to the substrate surface in the absence of an applied voltage, and tilt in a direction normal to the substrate surface in the presence of an applied voltage.

A pixel which is a minimum display unit of the liquid crystal display device 100 has a reflection region 120R defined by the reflective electrode 69 and a transmission region 120T defined by the transparent electrode 68. The thickness of the liquid crystal layer 140 is denoted by dr in the reflection region 120R and dt in the transmission region 120T (dt>dr). The purpose of this is to render the length of an optical path of reflected light in the reflection region 120R substantially equal to that of transmitted light in the transmission region 120T (both the reflected light and the transmitted light contribute to a display). Although it is preferable that dt=2dr, the relationship between dt and dr should be appropriately determined, considering display characteristics. At least dt>dr should be satisfied. Typically, dt is about 4 $\mu$m to about 6 $\mu$m, and dr is about 2 $\mu$m to about 3 $\mu$m.

More specifically, a difference in step of about 2 μm to about 3 μm is provided in each pixel region in the active matrix substrate 70. In the case where the reflective electrode 69 has unevenness as shown in FIG. 1A, an average value of the unevenness should be determined as dr. In this manner, in the reflection/transmission type liquid crystal display device 100, the reflection region and the transmission region having different thicknesses of the liquid crystal layer 140 are formed. In the present embodiment, the reflection region 120R and the transmission region 120T having different heights are formed on the active matrix substrate 70 on the liquid crystal layer 140 side.

In the case where a liquid crystal display device of a normally black mode is produced by using horizontal alignment, controlling a cell gap is likely to be difficult. In the present embodiment, in order to obtain a large process margin, a normally white mode is adopted.

A display principle of the liquid crystal display device 100 of a normally white mode shown in FIG. 1A will be described in detail with reference to FIGS. 2, 3, and 4. Herein, the case will be described, in which the phase difference compensators 170 and 180 have phase difference plates (half-wave plates) 170a and 180b for compensating for color and phase difference plates (quarter-wave plates) 170b and 180a for converting linearly-polarized light to circularly-polarized light. The half-wave plates 170a and 180b are provided for the purpose of suppressing coloring of a display. Thus, in the case where some coloring is acceptable, it is not required to use the half-wave plates 170a and 180b. Furthermore, in the case where a non-coloring display is performed, two half-wave plates should be used. The number of half-wave plates to be used should be appropriately set depending upon the use of a liquid crystal display device. In the case where the thickness of a liquid crystal layer is varied between a transmission region and a reflection region when liquid crystal molecules are twisted, disclination lines are likely to be formed in portions having difference in step (i.e., boundaries of these regions). Thus, horizontal alignment with a twist angle of about 0° is most preferable.

FIG. 2 shows a polarized state of light in each layer in the case where a white display is performed in the reflection region 120R.

Incident light becomes linearly-polarized light by the polarizing plate 172, and is incident upon the half-wave plate 170a for compensating for color. The polarized state is not changed by the half-wave plate 170a, and the direction of a polarization axis of the linearly-polarized light is changed. Thereafter, the linearly-polarized light incident upon the quarter-wave plate 170b becomes circularly-polarized light, and is incident upon the liquid crystal layer 140. Since an effective phase difference of the liquid crystal layer 140 in a white display state is adjusted to a ¼ wavelength, the incident circularly-polarized light becomes linearly-polarized light. The linearly-polarized light having passed through the liquid crystal layer 140 is reflected by a reflective plate (reflective electrode 69) while keeping the polarized state, and is incident upon the liquid crystal layer 140 again. The linearly-polarized light having passed through the liquid crystal layer 140 becomes circularly-polarized light, and is converted to linearly-polarized light by the quarter-wave plate 170b. Thereafter, the linearly-polarized light passes through the half-wave plate 170a, and is output through the polarizing plate 172.

Figure 3:
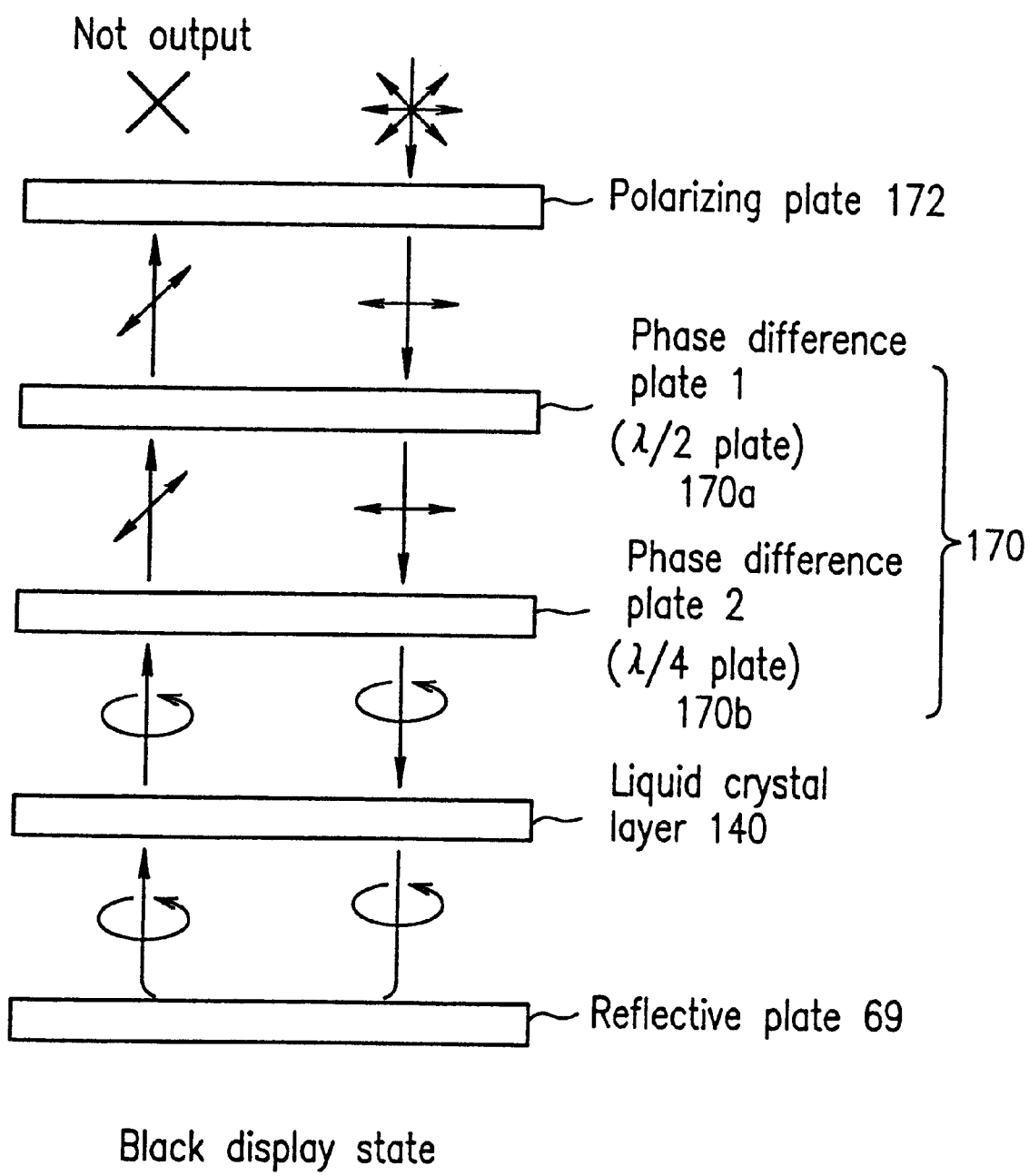
FIG. 3 shows a polarized state of light in each layer in the case where a black display is performed in the reflection region.

FIG. 3 shows a polarized state of light in each layer in the case where a black display is performed in the reflection region 120R.

Incident light becomes linearly-polarized light by the polarizing plate 172, and is incident upon the half-wave plate 170a for compensating for color. The polarized state is not changed by the half-wave plate 170a, and the direction of a polarization axis of the linearly-polarized light is changed. Thereafter, the linearly-polarized light incident upon the quarter-wave plate 170b becomes circularly-polarized light, and is incident upon the liquid crystal layer 140. Since an effective phase difference of the liquid crystal layer 140 is adjusted to 0 due to an applied voltage for a black display, the incident circularly-polarized light passes therethrough as circularly-polarized light. The circularly-polarized light having passed through the liquid crystal layer 140 is reflected by the reflective plate 69 while keeping the polarized state, and is incident upon the liquid crystal layer 140. The circularly-polarized light passes through the liquid crystal layer 140 while keeping the polarized state, and is converted to linearly-polarized light by the quarter-wave plate 170b. At this time, the polarization direction of the linearly polarized light is rotated by about 90° compared with the case of a white display state. The linearly-polarized light having passed through the half-wave plate 170a is absorbed by the polarizing plate 172, so that it is not output from the liquid crystal display device.

Figure 4:
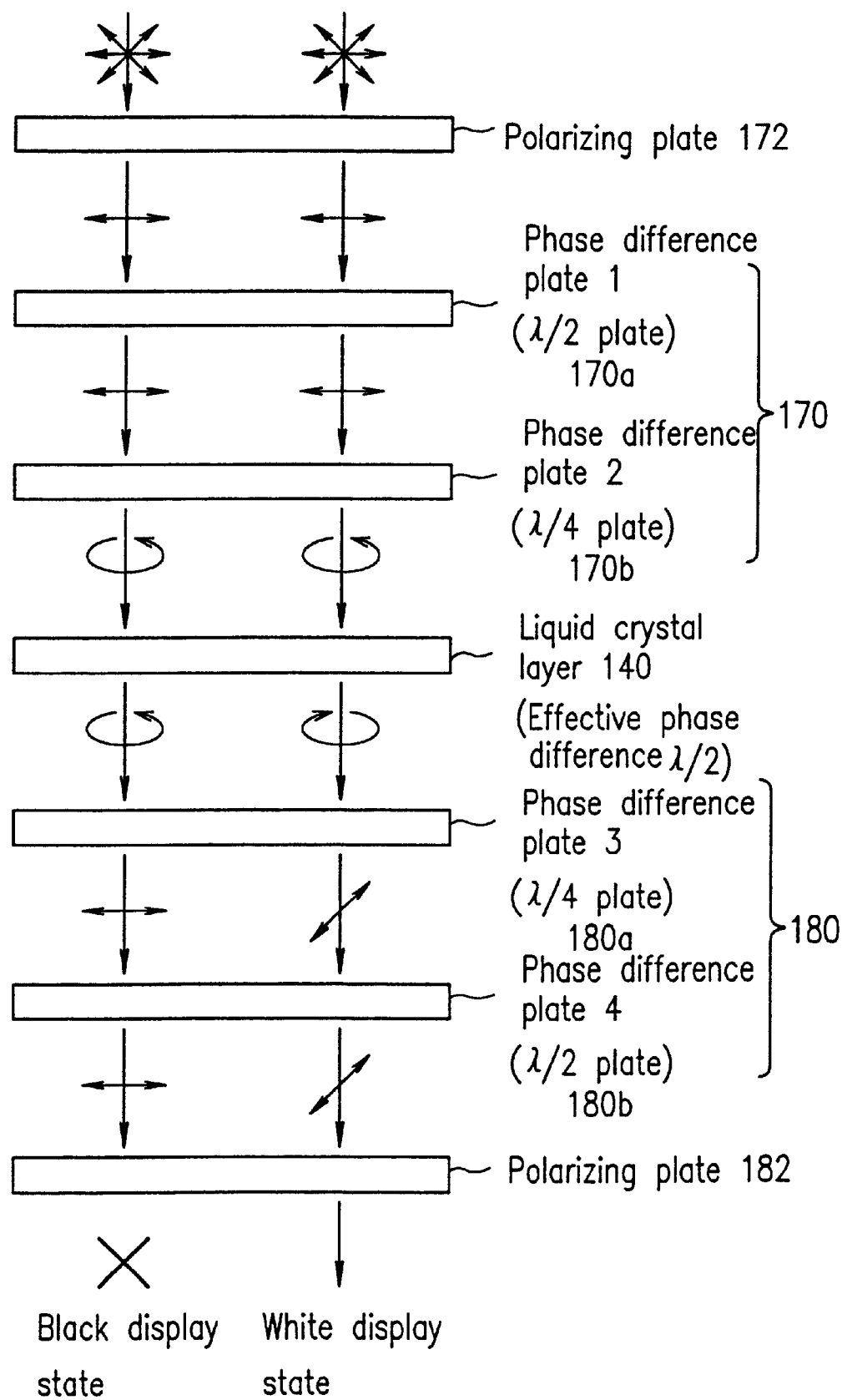
FIG. 4 shows a polarized state of light in each layer in the case where a display is performed in a transmission region.

FIG. 4 shows a polarized state of light in each layer in the case where a white display and a black display are performed in the transmission region 120T. As for designing of the reflection/transmission type liquid crystal display device, arrangement of the polarizing plate 172, retardation of the phase difference compensators 170a and 170b, and arrangement of a phase-delay axis are determined with respect to the reflection region 120R, and thereafter, retardation of the phase difference compensators 180a and 180b, arrangement of a phase-delay axis, and arrangement of the polarizing plate 182 are determined with respect to the transmission region 120T. FIG. 4 shows a polarized state in each layer in the case where light is incident from the polarizing plate 172 provided on a viewer side of the liquid crystal display device 100, reflecting a procedure of the above-mentioned design. Actually, light from a backlight is used for a display in the transmission region 120T, and is incident from the polarizing plate 182. However, a change in polarized state of light incident from the polarizing plate 182 in each layer is the same as that shown in FIG. 4.

The transmission region 120T is basically constructed in such a manner that the structures of the reflection region 120R are disposed to be symmetric with respect to the reflective plate 69. A polarized state inn each layer and a change in polarization direction are basically the same as that described with respect to the reflection region. The optical retardation of the liquid crystal layer 140 is adjusted to a ½ wavelength (twice that of the reflection region 120R).

As described above, in the case where a display is performed by using the reflection region 120R and the transmission region 120T, in order to realize the maximum reflectivity and transmissivity, the optical retardation of the liquid crystal layer 140 are required to be at least about a ¼ wavelength and at least about a ½ wavelength in the reflection region 120R and the transmission region 120T, respectively. Furthermore, the difference between retardation in the presence of an applied voltage for a black display and retardation in the absence of an applied voltage is required to be at least about a ¼ wavelength and at least about a ½ wavelength in the reflection region and the transmission region, respectively.

In order to realize the above-mentioned optical retardation in the reflection region 120R and the transmission region 120T, various embodiments can be utilized. For example, a liquid crystal layer subjected to homogeneous alignment, a twist-aligned liquid crystal layer, a liquid crystal layer subjected to hybrid alignment, and the like can be used.

When a liquid crystal display mode is used, in which liquid crystal molecules (at least part of liquid crystal molecules) are aligned in a direction horizontal to the substrate surface in the absence of an applied voltage, a sufficient black display cannot be realized. This problem will be described below.

When a sufficiently high voltage is applied across electrodes opposing each other with a liquid crystal layer interposed therebetween, liquid crystal molecules rise in a direction substantially vertical (parallel to an electric field) to the substrate surface, and the optical retardation of the liquid crystal layer becomes nearly 0. However, since an applied voltage for a black display is limited (typically about 5 volts), alignment of liquid crystal molecules is not sufficiently changed, and limited optical retardation remains in the liquid crystal layer. In particular, liquid crystal molecules in the vicinity of the surface of an alignment film are not vertically aligned at an applied driving voltage, due to the anchoring effect of the alignment film; thus, the retardation of the liquid crystal layer does not become 0. As a result, when a liquid crystal display mode is used, in which liquid crystal molecules (at least part of liquid crystal molecules) are aligned in a direction parallel to the substrate surface in the absence of a voltage, a sufficient black display cannot be realized. As a result, a sufficient contrast cannot be obtained.

In order to overcome the above-mentioned problem, in the reflection region 120R, the optical retardation of the quarter-wave plate is adjusted so as to realize a black display even in a practically used voltage range. More specifically, in the case where retardation of α remains in the liquid crystal layer 140, a phase-delay axis of the quarter-wave plate 170b is aligned substantially in a direction of an effective phase-delay axis of the liquid crystal layer 140, and the optical retardation of the quarter-wave plate 170b is prescribed to be (λ/4−α). This allows a ¼ wavelength condition to be satisfied in the entire liquid crystal cell, together with the optical retardation remaining in the liquid crystal layer 140 in the presence of an applied voltage. As another method, a phase-delay axis of the quarter-wave plate 170b is prescribed to be orthogonal to the direction of an effective phase-delay axis of the liquid crystal layer 140, and the optical retardation of the quarter-wave plate 170b is prescribed to be (λ/4+α), whereby optical retardation remaining in the liquid crystal layer 140 in the presence of an applied voltage is canceled, and a ¼ wavelength condition can be satisfied.

As for the transmission region 120T, the structure of the reflection region 120R is set as described above, and thereafter, a main axis or a minor axis of elliptically-polarized light output from the transmission region 120T is combined with an optical axis (phase-delay axis) of the quarter-wave plate 180b, whereby the elliptically-polarized light is converted to linearly-polarized light, and a polarization axis of the polarizing plate 182 is set in a direction orthogonal to a polarization axis of the linearly-polarized light. Thus, the above-mentioned problem can be solved.

Alternatively, in the transmission region 120T, in the case where retardation of β remains, a phase-delay axis of the quarter-wave plate 180a is aligned substantially in a direction of an effective phase-delay axis of the liquid crystal layer 140, and the optical retardation of the quarter-wave plate 180a is prescribed to be (λ/4−(β−α)). This allows the ½ wavelength condition to be satisfied, together with the optical retardation remaining in the liquid crystal layer 140 in the presence of an applied voltage. Alternatively, the following may be possible: a phase-delay axis of the quarter-wave plate 180a is prescribed to be orthogonal to the direction of an effective phase-delay axis of the liquid crystal layer 140, and the optical retardation of the quarter-wave plate 180a is prescribed to be (λ/4+(β−α)), whereby the optical retardation remaining in the liquid crystal layer 140 in the presence of an applied voltage is canceled, and the ½ wave condition is satisfied.

Figure 5:
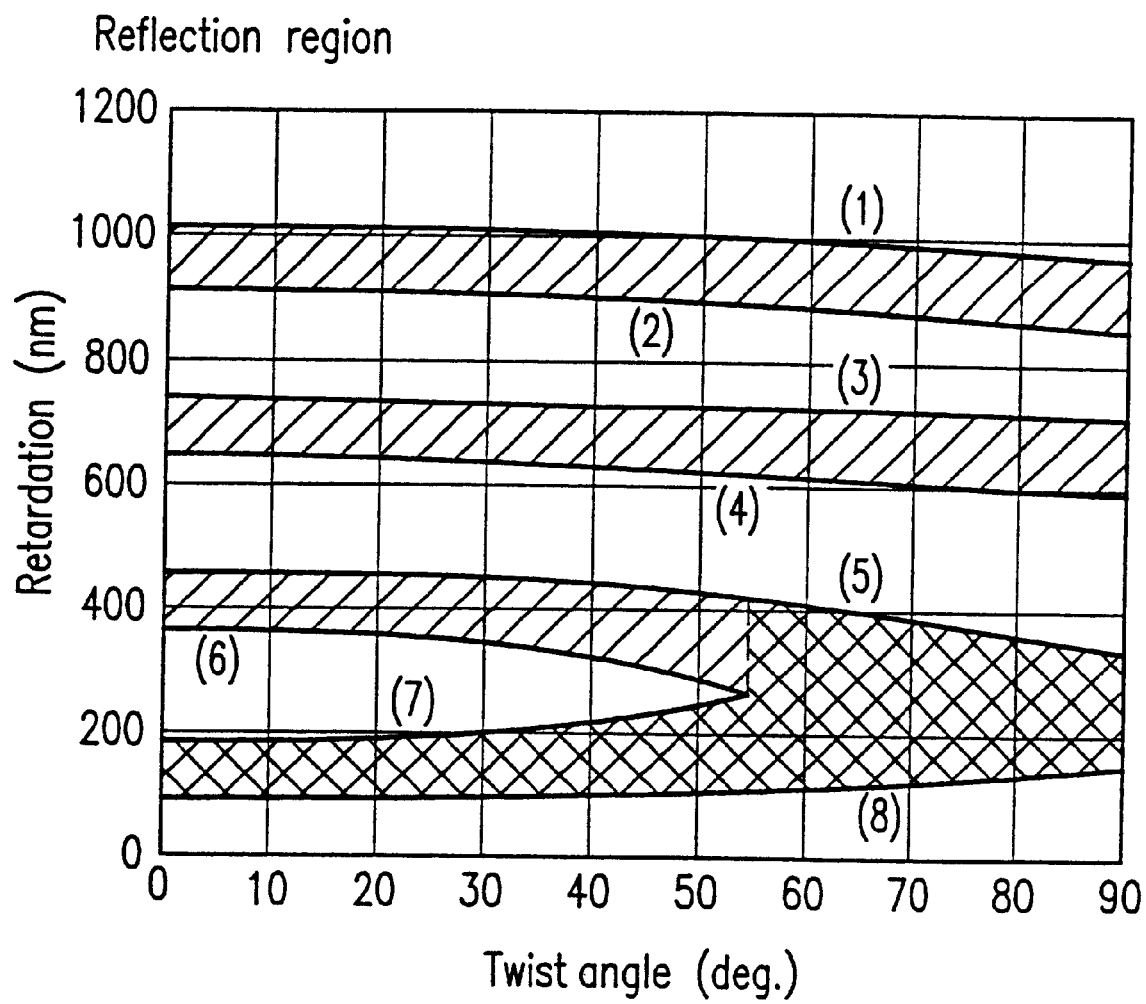
FIG. 5 is a graph showing a relationship between the twist angle and the retardation in the reflection region (with a reflectivity of about 70% or more) of a liquid crystal layer.
Figure 6:
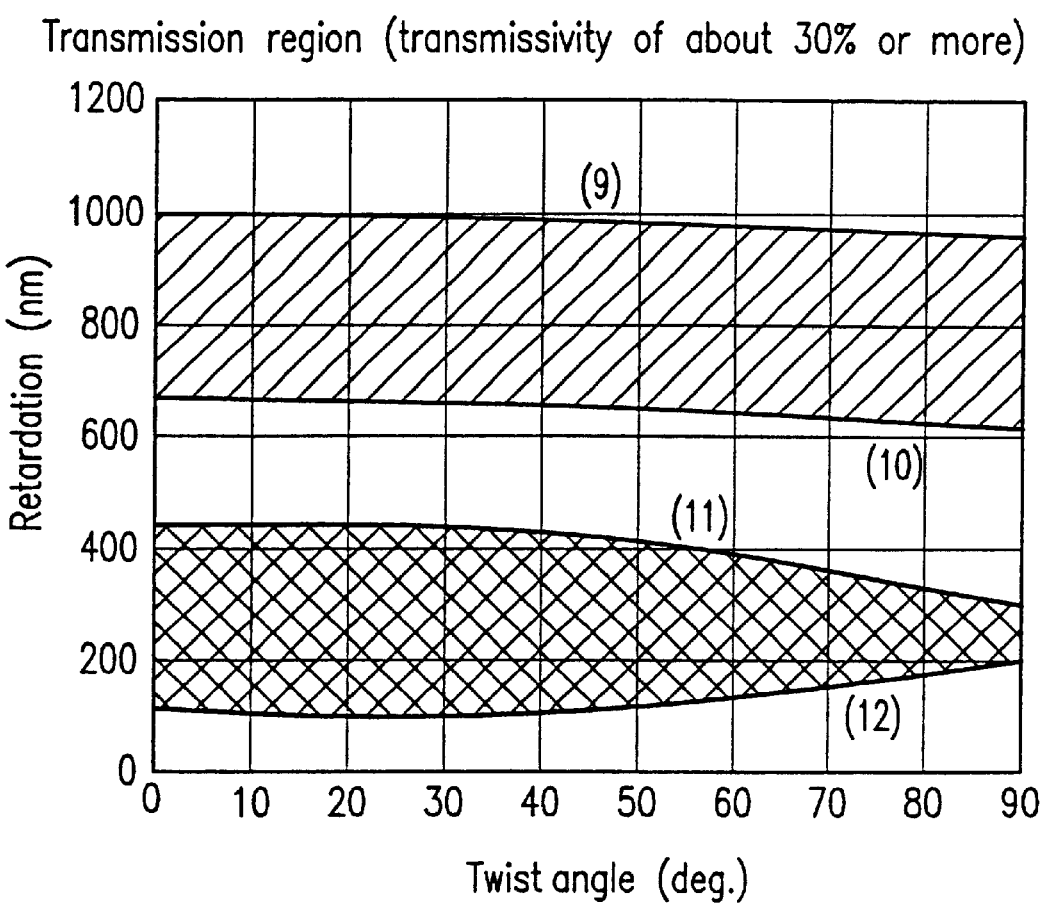
FIG. 6 is a graph showing a relationship between the twist angle and the retardation in the transmission region (with a transmissivity of about 30% or more) of the liquid crystal layer.

Next, display characteristics of the reflection/transmission type liquid crystal display device according to the present invention will be described. FIG. 5 shows a relationship between the twist angle $\theta_t$ and the retardation of the liquid crystal layer 140 with respect to the reflection region 120R when the phase difference compensators 170 and 180 are quarter-wave plates in the liquid crystal display device 100 shown in FIG. 1. FIG. 6 shows a relationship between the twist angle $\theta_t$ and the retardation of the liquid crystal layer 140 with respect to the transmission region 120T when the phase difference compensators 170 and 180 are quarter-wave plates in the liquid crystal display device 100 shown in FIG. 1.

Regarding the reflection region 120R, 70% or more of use efficiency can be obtained in hatched regions shown in FIG. 5 at a twist angle $\theta_t$ in a range of $0° \leq \theta_t \leq 90°$. The hatched regions in FIG. 5 correspond to those in which retardation Rd (Rd=Δn·d, where Δn is a birefringence index of a liquid crystal layer, and d is a thickness of the liquid crystal layer in each region) is within curves represented by the following Formulae (1) and (2) and Formulae (3) and (4), those in which retardation Rd is within curves represented by Formulae (5) and (6) and Formulae (7) and (8) in a range of $0° \leq \theta_t \leq 54.3°$, and those in which retardation Rd is curves represented by Formulae (5) and (8) in a range of $54.3° < \theta_t \leq 90°$ $$Rd = -0.0043 \cdot \theta_t^2 - 0.065 \cdot \theta_t + 1011.8 \quad (1)$$

$$Rd = -0.0089 \cdot \theta_t^2 + 0.1379 \cdot \theta_t + 914.68 \quad (2)$$

$$Rd = -0.0015 \cdot \theta_t^2 - 0.1612 \cdot \theta_t + 737.29 \quad (3)$$

$$Rd = -0.0064 \cdot \theta_t^2 - 0.0043 \cdot \theta_t + 640.65 \quad (4)$$

$$Rd = -0.0178 \cdot \theta_t^2 + 0.2219 \cdot \theta_t + 458.92 \quad (5)$$

$$Rd = -0.0405 \cdot \theta_t^2 + 0.4045 \cdot \theta_t + 364.05 \quad (6)$$

$$Rd = 0.0347 \cdot \theta_t^2 - 0.4161 \cdot \theta_t + 186.53 \quad (7)$$

$$Rd = 0.0098 \cdot \theta_t^2 - 0.1912 \cdot \theta_t + 89.873 \quad (8)$$

On the other hand, regarding the transmission region 120T, 30% or more of use efficiency can be obtained in hatched regions shown in FIG. 6 at a twist angle $\theta_t$ in a range of $0° \leq \theta_t \leq 90°$. The hatched regions in FIG. 6 correspond to those in which retardation Rd is within curves represented by Formulae (9) and (10) and Formulae (11) and (12).

$$Rd = -0.0043 \cdot \theta_t^2 - 0.065 \cdot \theta_t + 995.66 \quad (9)$$

$$Rd = -0.0058 \cdot \theta_t^2 - 0.0202 \cdot \theta_t + 665.8 \quad (10)$$

$$Rd = -0.0248 \cdot \theta_t^2 + 0.6307 \cdot \theta_t + 439.58 \quad (11)$$

$$Rd = 0.0181 \cdot \theta_t^2 - 0.6662 \cdot \theta_t + 109.51 \quad (12)$$

Under the above-mentioned condition, retardation becomes 0 by applying a sufficient voltage to a liquid crystal layer, and a dark display with a high contrast can be realized.

Furthermore, by prescribing the retardation Rd in a region within the curves represented by Formulae (7) and (8) at the twist angle $\theta_t$ of the reflection region in a range of $0°\leq\theta_t\leq 54.3°$, and in a region (double-hatched region in FIG. 5) within the curves represented by Formulae (5) and (8) at the twist angle $\theta_t$ of the reflection region in a range of $54.3°\leq\theta_t\leq 90°$, and by prescribing the retardation Rd in a region (double-hatched region in FIG. 6) within the curves represented by Formulae (11) and (12) at the twist angle $\theta_t$ of the transmission region in a range of $0°\leq\theta_t\leq 90°$, retardation of a liquid crystal layer in the reflection region and the transmission region becomes 0 in the presence of an applied voltage. If a black display is set to be performed at this time, a satisfactory black display is realized by applying the same voltage to the reflection region and the transmission region.

Figure 7:
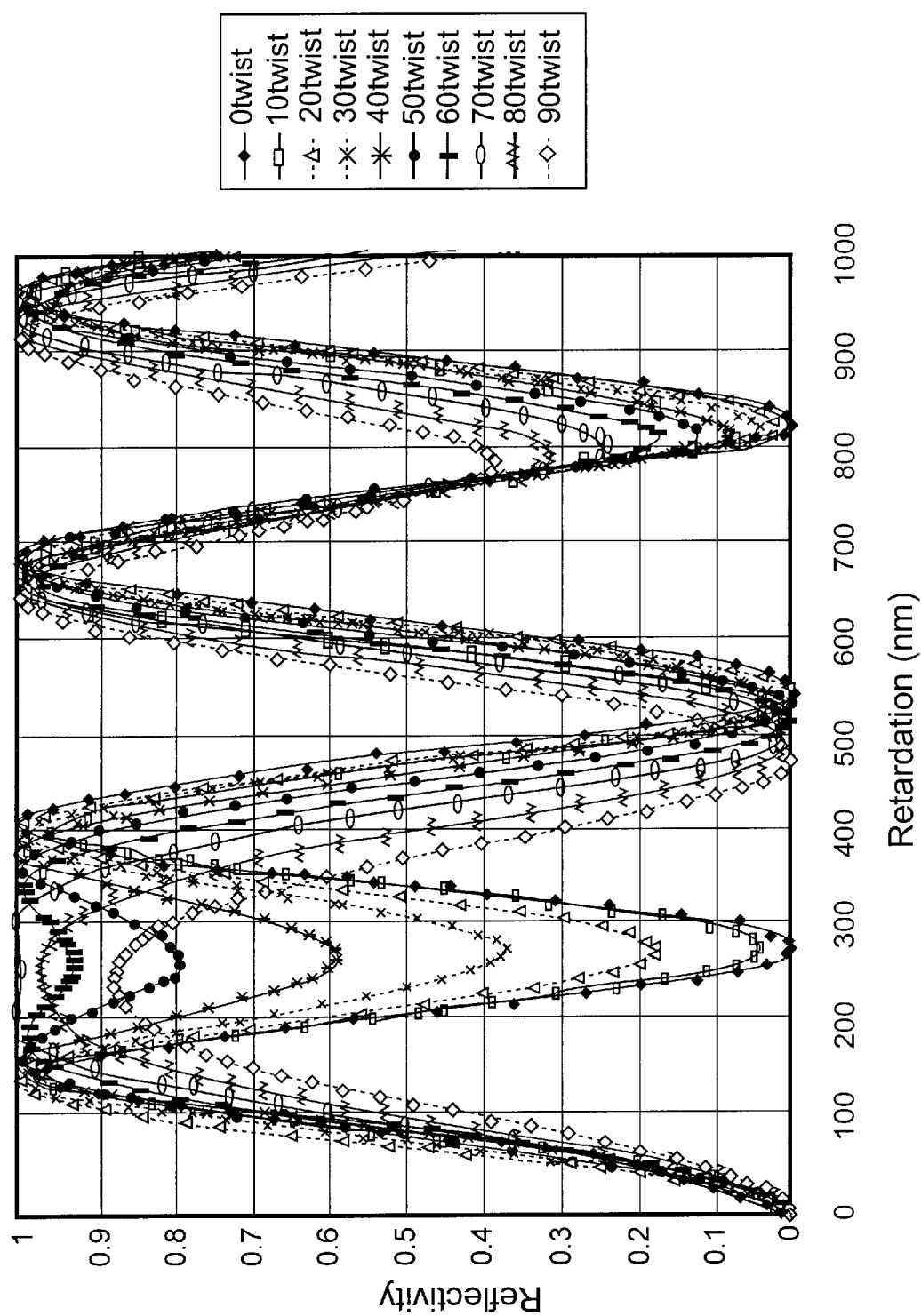
FIG. 7 is a graph showing the effects of retardation on reflectivity at various twist angles.
Figure 8:
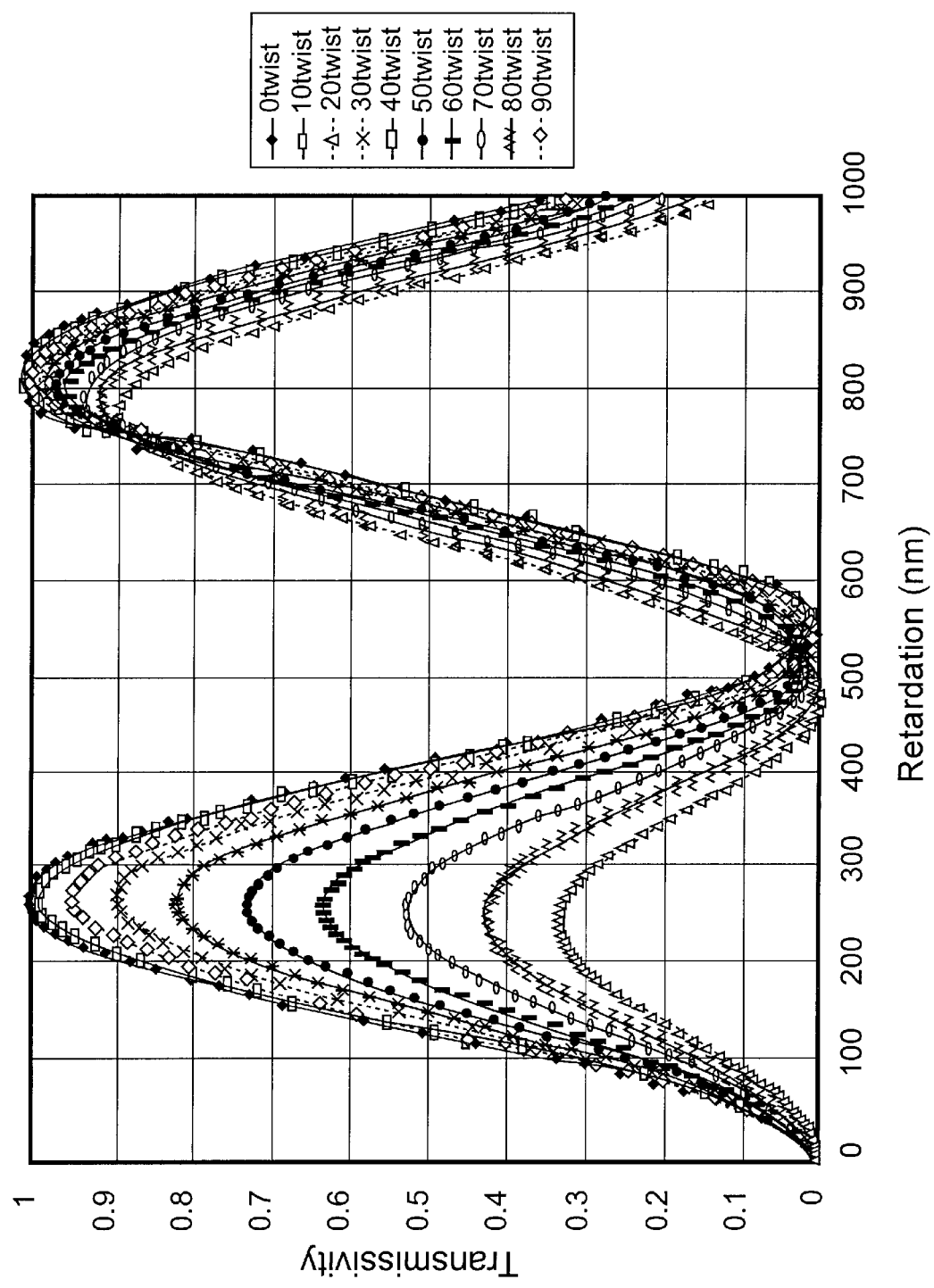
FIG. 8 is a graph showing the effects of retardation on transmissivity at various twist angles.

FIGS. 7 and 8 show the effects of retardation on reflectivity and transmissivity at each twist angle $\theta_t$. FIGS. 5 and 6 show regions where reflectivity is about 70% or more and transmissivity is about 30% or more, respectively.

Furthermore, the above-mentioned condition corresponds to the case where a white region in which retardation is closest to 0 (i.e., the first peak from the lowest retardation side in FIGS. 7 and 8) is selected as a condition of realizing a white display. Thus, a gray-scale display is also satisfactorily performed. More specifically, in a gray-scale state in which a white display is changed to a black display, brightness (reflectivity and transmissivity) is monotonously decreased, so that a satisfactory gray-scale display is obtained. If a white display is performed by using the second peak from the lowest retardation side in FIGS. 7 and 8, the first peak is present in a region for a gray-scale display. Thus, a satisfactory gray-scale display cannot be performed.

Figure 9:
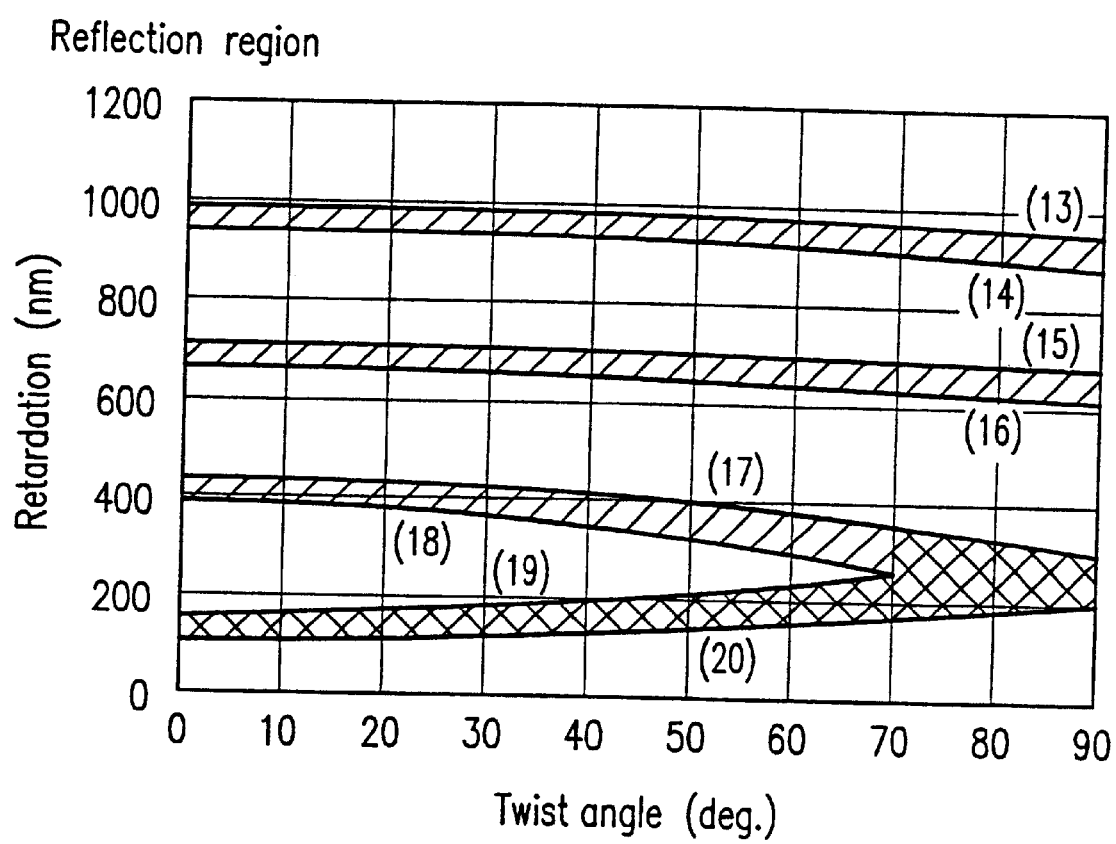
FIG. 9 shows a relationship between the twist angle and the retardation in the reflection region (with a reflectivity of about 90% or more) of the liquid crystal layer.
Figure 10:
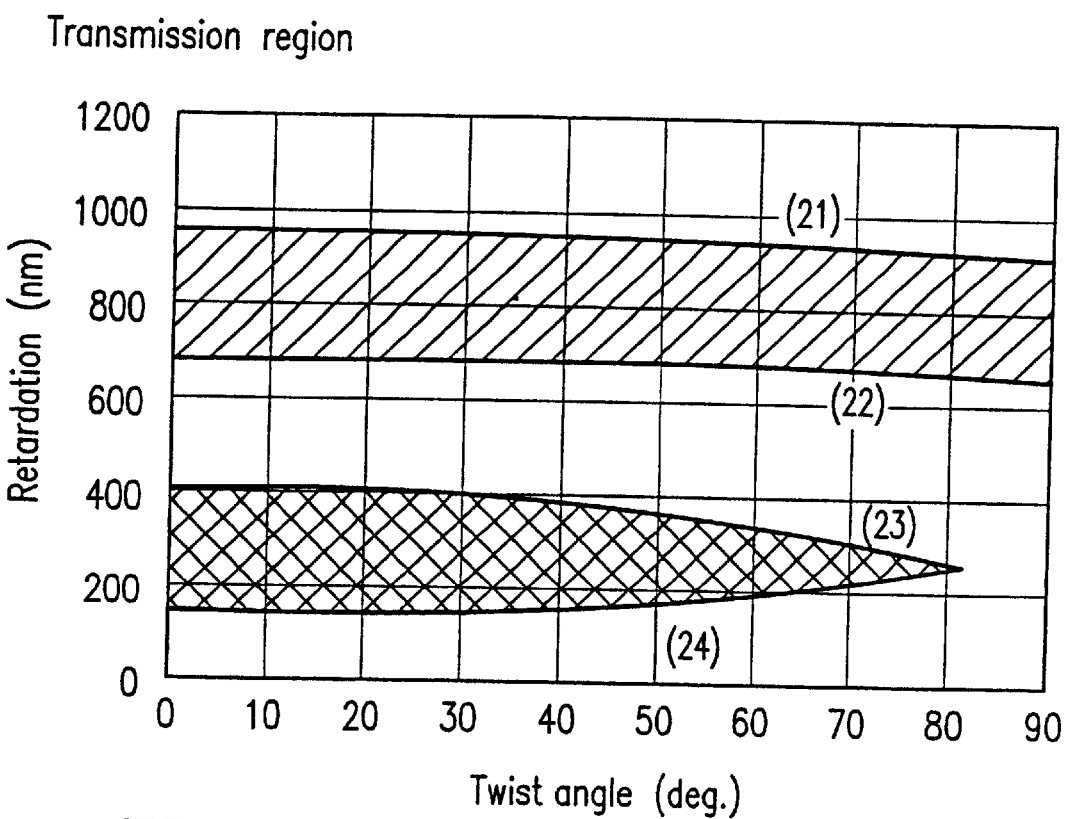
FIG. 10 shows a relationship between the twist angle and the retardation in the transmission region (with a transmissivity of about 50% or more) of the liquid crystal layer.
Figure 11:
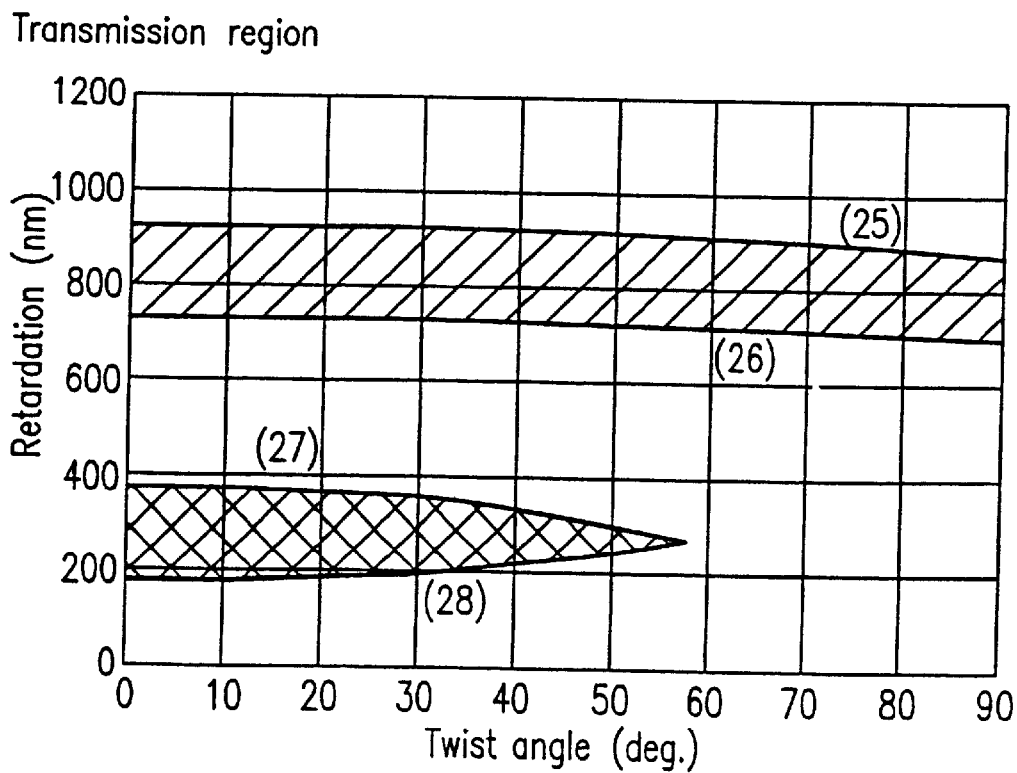
FIG. 11 shows a relationship between the twist angle and the retardation in the transmission region (with a transmissivity of about 70% or more) of the liquid crystal layer.
Figure 12:
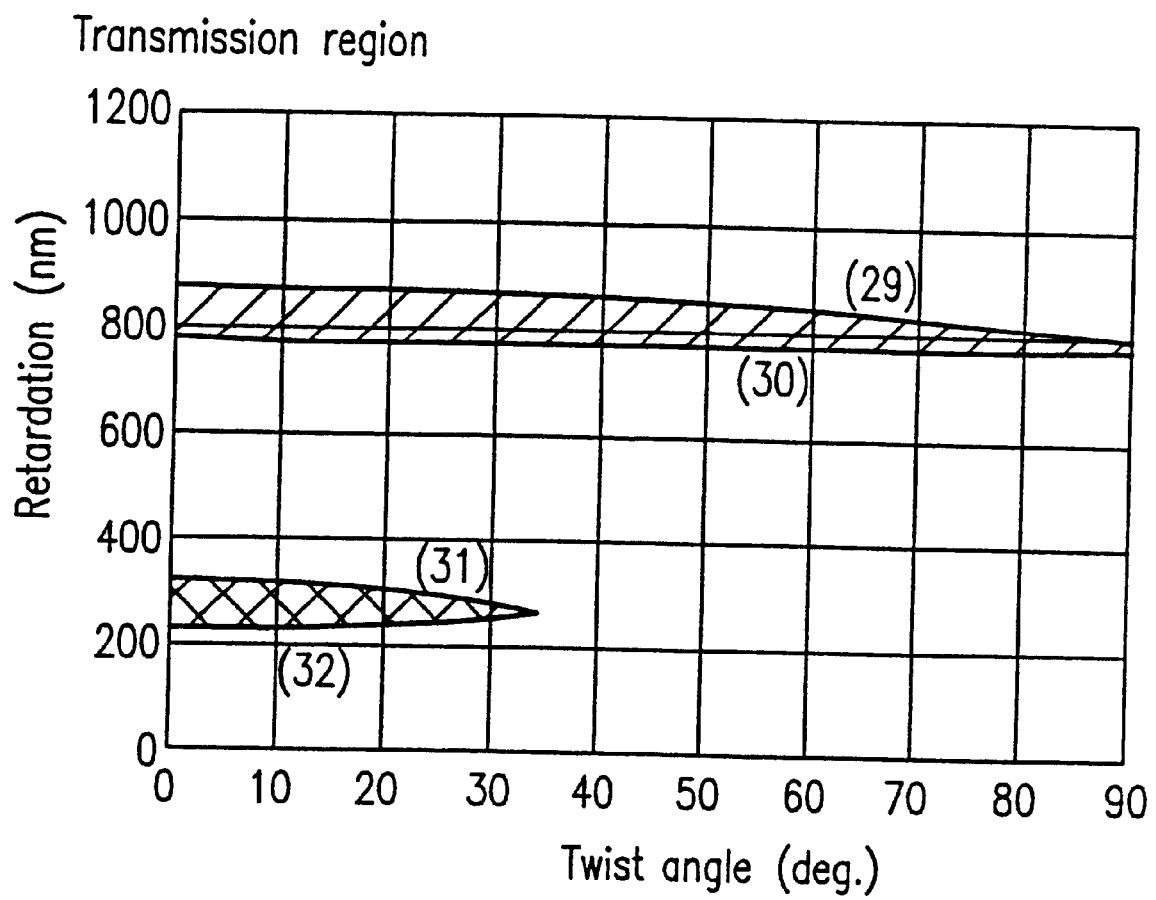
FIG. 12 shows a relationship between the twist angle and the retardation in the transmission region (with a transmissivity of about 90% or more) of the liquid crystal layer.

Similarly, a region where reflectivity becomes about 90% or more (FIG. 9), a region where transmissivity becomes about 50% or more (FIG. 10), a region where transmissivity becomes about 70% or more (FIG. 11), and a region where transmissivity becomes about 90% or more (FIG. 12) are obtained. Formulae representing each region is shown below.

Reflectivity: about 90% or more $$Rd=-0.0043\cdot\theta_t^2-0.065\cdot\theta_t+987.57 \quad (13)$$

$$Rd=-0.0074\cdot\theta_t^2+0.049\cdot\theta_t+938.59 \quad (14)$$

$$Rd=-0.0043\cdot\theta_t^2+0.0282\cdot\theta_t+712.36 \quad (15)$$

$$Rd=-0.0061\cdot\theta_t^2+0.0564\cdot\theta_t+662.94 \quad (16)$$

$$Rd=-0.0192\cdot\theta_t^2+0.1721\cdot\theta_t+435.68 \quad (17)$$

$$Rd=-0.0347\cdot\theta_t^2+0.5085\cdot\theta_t+387.16 \quad (18)$$

$$Rd=0.0217\cdot\theta_t^2-0.1589\cdot\theta_t+162.09 \quad (19)$$

At an intersection between Formula (18) and Formula (19), the twist angle $\theta_t$ is about 69.5°.

$$Rd=0.0167\cdot\theta_t^2-0.4884\cdot\theta_t+115.56 \quad (20)$$

Transmissivity: about 50% or more $$Rd=-0.0046\cdot\theta_t^2-0.0913\cdot\theta_t+959.69 \quad (21)$$

$$Rd=-0.0037\cdot\theta_t^2-0.076\cdot\theta_t+692.65 \quad (22)$$

$$Rd=-0.0308\cdot\theta_t^2+0.5971\cdot\theta_t+407.2 \quad (23)$$

$$Rd=0.0246\cdot\theta_t^2-0.7079\cdot\theta_t+148.65 \quad (24)$$

At an intersection between Formula (23) and Formula (24), the twist angle $\theta_t$ is about 81.0°.

Transmissivity: about 70% or more $$Rd=-0.0074\cdot\theta_t^2+0.049\cdot\theta_t+922.41 \quad (25)$$

$$Rd=-0.0043\cdot\theta_t^2+0.0282\cdot\theta_t+728.54 \quad (26)$$

$$Rd=-0.0419\cdot\theta_t^2+0.5461\cdot\theta_t+371.27 \quad (27)$$

$$Rd=0.0347\cdot\theta_t^2-0.5085\cdot\theta_t+179.14 \quad (28)$$

At an intersection between Formula (27) and Formula (28), the twist angle $\theta_t$ is about 57.5°.

Transmissivity: about 90% or more $$Rd=-0.0127\cdot\theta_t^2+0.1931\cdot\theta_t+877.69 \quad (29)$$

$$Rd=0.0048\cdot\theta_t^2-0.4527\cdot\theta_t+779.34 \quad (30)$$

$$Rd=-0.0809\cdot\theta_t^2+0.809\cdot\theta_t+323.6 \quad (31)$$

$$Rd=0.0404\cdot\theta_t^2-0.4045\cdot\theta_t+226.52 \quad (32)$$

At an intersection between Formula (31) and Formula (32), the twist angle $\theta_t$ is about 34.0°.

Furthermore, by setting retardation and a twist angle of a liquid crystal layer in the double-hatched regions in FIGS. 9, 10, 11, and 12, brightness in a gray-scale state in which a white display is changed to a black display is monotonously decreased. Therefore, a satisfactory gray-scale display is obtained.

The twist alignment has been described. However, the above applies to the case of hybrid alignment. In the hybrid alignment, one substrate is subjected to horizontal alignment, and the other is subjected to vertical alignment. The optimum retardation in this case should be considered with respect to the twist angle $\theta_t$ of 0° in FIGS. 5 and 6. Characteristics thus obtained become similar to those in horizontal alignment where the twist angle $\theta_t$ is 0°.

A liquid crystal material having refractive index anisotropy $\Delta n=0.06$ and positive dielectric anisotropy is used for the liquid crystal layer 140.

Figure 13:
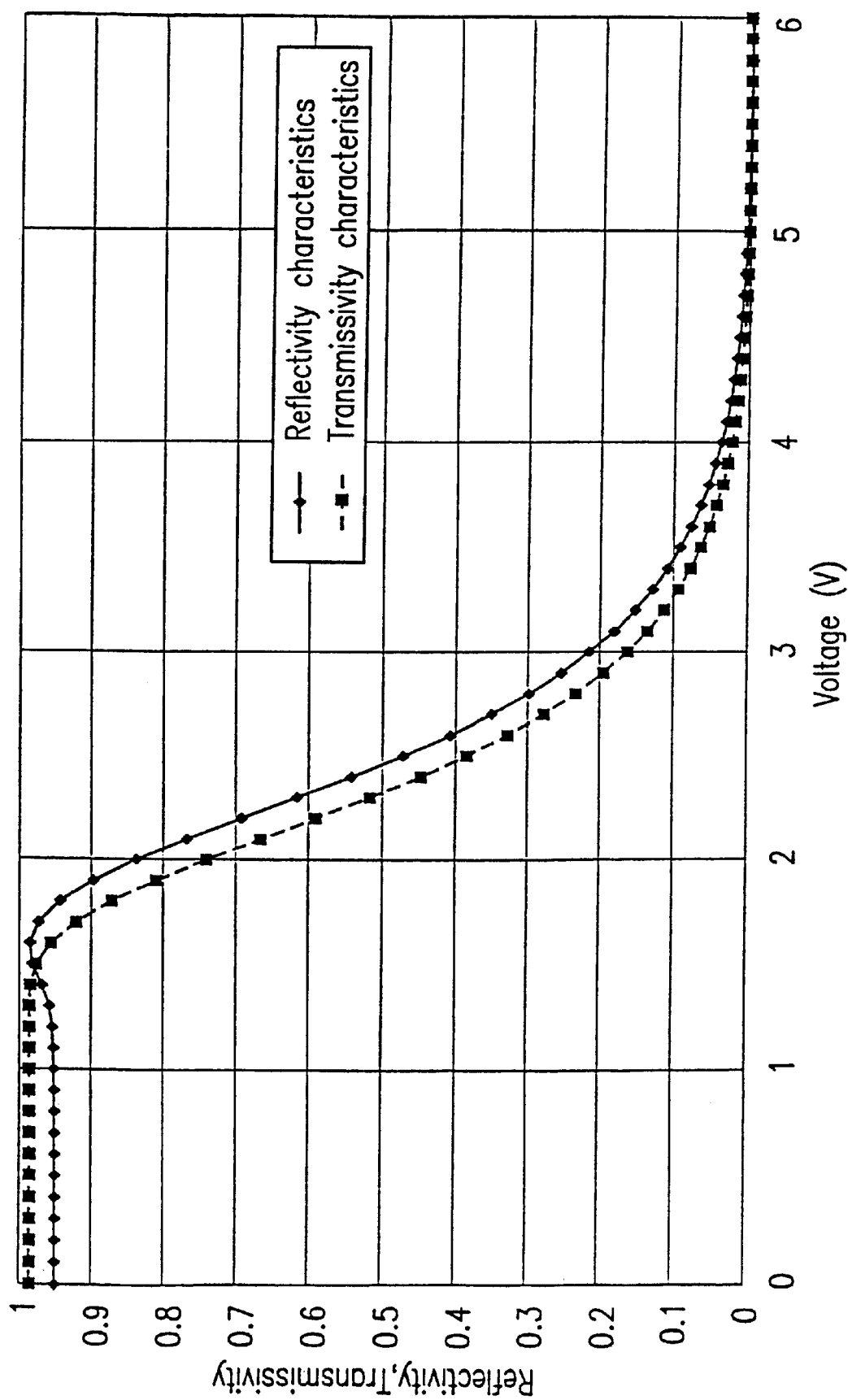
FIG. 13 shows voltage-transmissivity characteristics and voltage-reflectivity characteristics when light is incident vertically upon a liquid crystal display device of an embodiment according to the present invention.

FIG. 13 shows voltage-transmissivity characteristics and voltage-reflectivity characteristics of the liquid crystal display device 100 shown in FIG. 1 when light is vertically incident upon the device, where a cell gap dt of the liquid crystal layer 140 in the transmission region 120T is about 5.50 μm, a cell gap dr of the liquid crystal layer 140 in the reflection region 120R is about 3.0 μm, a twist angle $\theta_t$ is about 0°, and a liquid crystal material having positive dielectric anisotropy with refractive index anisotropy $\Delta n$ of about 0.06 is used for the liquid crystal layer 140.

In FIG. 13, spectroscopic transmissivity is prescribed to be 1 when light is vertically incident upon the air. In this case, when an applied voltage is about 5 volts in the reflection region 120R, residual retardation α of about 30 nm remains in the liquid crystal layer 140. Therefore, retardation of the phase difference compensator 170b is prescribed to be about 110 nm, and a phase-delay axis of the phase difference compensator 170b is matched with that of the liquid crystal layer 140. A phase-delay axis of the phase difference compensator 170a and a polarization axis of the polarizing plate 172 are set so that linearly-polarized light is incident in a direction rotated by about 45° with respect to the phase-delay axis of the liquid crystal layer 140. Retardation of the phase difference compensator 180a is prescribed to be about 140 nm, and the direction of an optical axis is matched with the major axis of elliptically-polarized light output from the liquid crystal layer 140. The converted linearly polarized light has its polarization direction changed by the phase difference compensator 180b, and a polarization axis of the polarizing plate 182 is set so as to be orthogonal to the polarization axis of the linearly polarized light.

Figure 14:
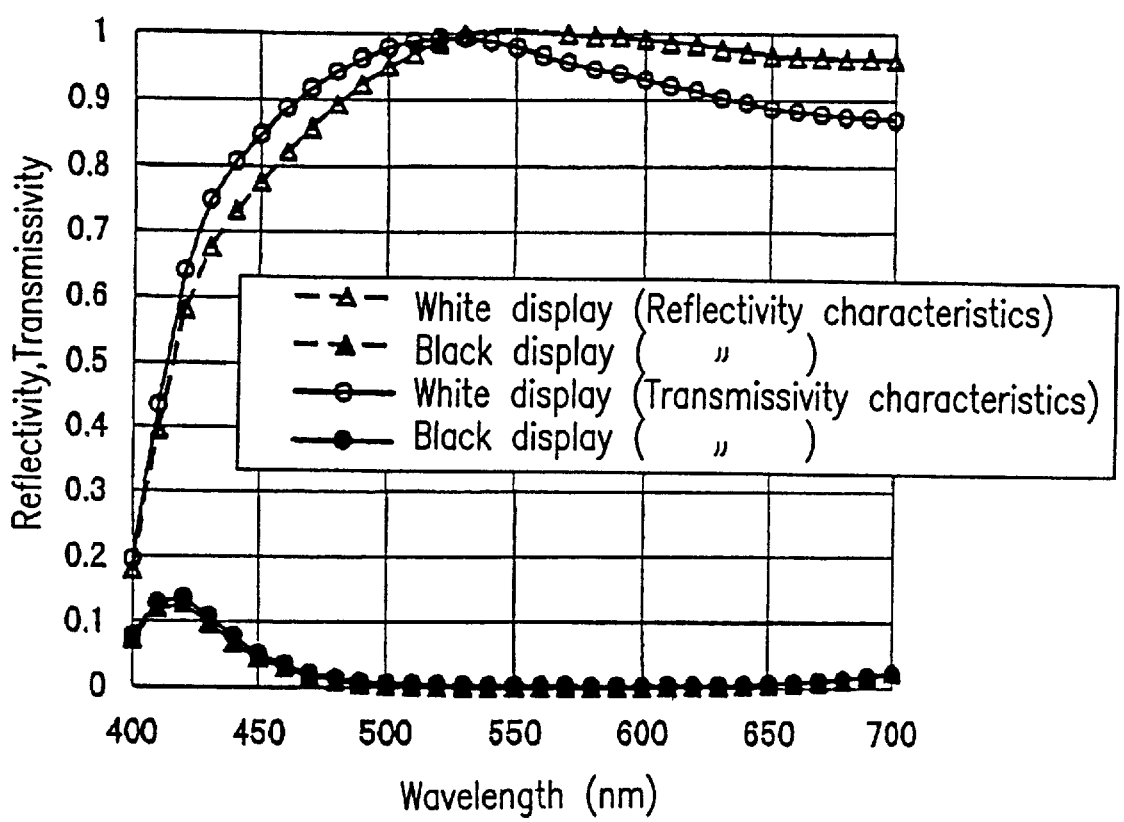
FIG. 14 is a graph showing spectroscopic luminance (reflectivity and transmissivity) characteristics in a white display and a black display of a liquid crystal display device of an embodiment according to the present invention.

FIG. 14 shows spectroscopic luminance (reflectivity and transmissivity) in a white display and a black display of the reflection/transmission type liquid crystal display device thus obtained. It is understood from FIG. 14 that a sufficient contrast ratio is obtained in the entire wavelength region from about 400 nm to about 700 nm in a white display in the absence of an applied voltage to the liquid crystal layer 140 and in a black display in the presence of an applied voltage of about 5 volts. It is also understood that the above-mentioned display method results in a high use efficiency and is suitable for a reflection/transmission type liquid crystal display device.

Thus, the reflection/transmission type liquid crystal display device can be used as a transmission type liquid crystal display device which performs a display utilizing light passing through the transmission region 120T with a backlight in the case where ambient light is dark, and as a reflection type liquid crystal display device which performs a display utilizing reflected light in the reflection region 120R in the case where ambient light is bright. Furthermore, even in the case where a display is performed in a transmission mode, a display is performed in a reflection mode in the reflection region 120R, which eliminates a phenomenon in which ambient light is reflected from a screen to make it difficult to watch a display as in a conventional transmission type liquid crystal display device.

Thus, a reflection/transmission type liquid crystal display device can be realized with one panel, in which a backlight is used in the case where ambient light is dark, in which ambient light is used instead of a backlight in the case where ambient light is bright, or in which a display may be performed by using both the backlight and the reflected light.

Unlike the conventional transmission type liquid crystal display device, in the reflection/transmission type liquid crystal display device, a backlight is not used in the case where ambient light is bright, so that a power consumption can be reduced. Furthermore, in the reflection/transmission type liquid crystal display device a backlight is used in the case where ambient light is dark; therefore, unlike the conventional reflection type liquid crystal display device, a sufficient display can be obtained even when ambient light is dark.

The case of a white display and a black display has been described. However, a color display can also be performed by providing a color filter of each color in corresponding portions of the reflection region and the transmission region.

It is desirable that dependency of reflectivity and transmissivity on an applied voltage (so-called γ characteristics) is substantially equal in the reflection region and the transmission region.

Figure 15A:
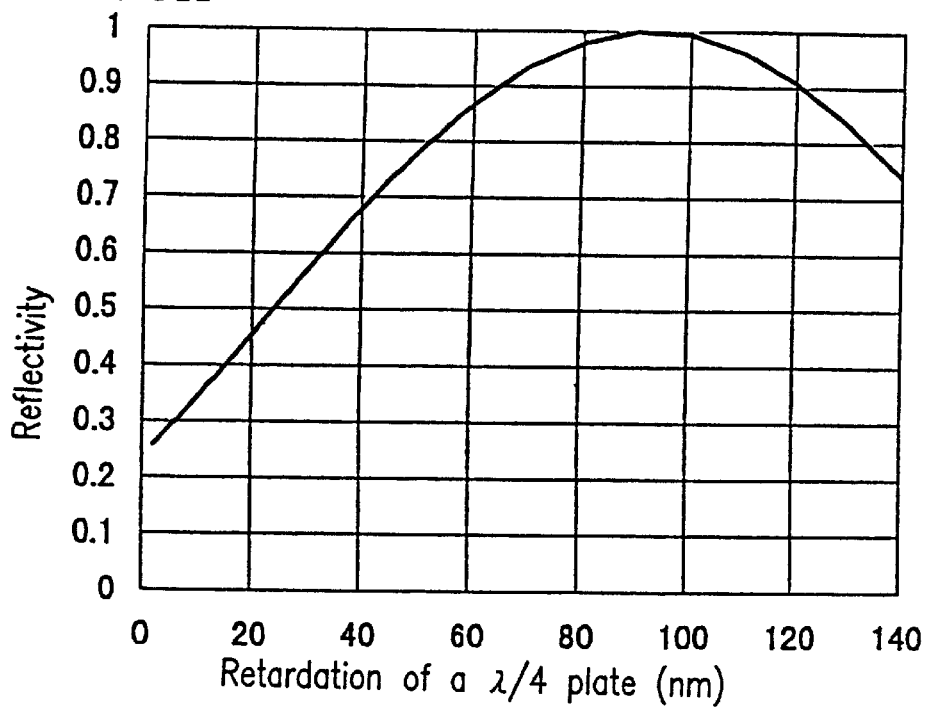
FIGS. 15A and 15B are graphs each showing a relationship between the retardation and the reflectivity of a quarter-wave plate in a reflection region.
Figure 15B:
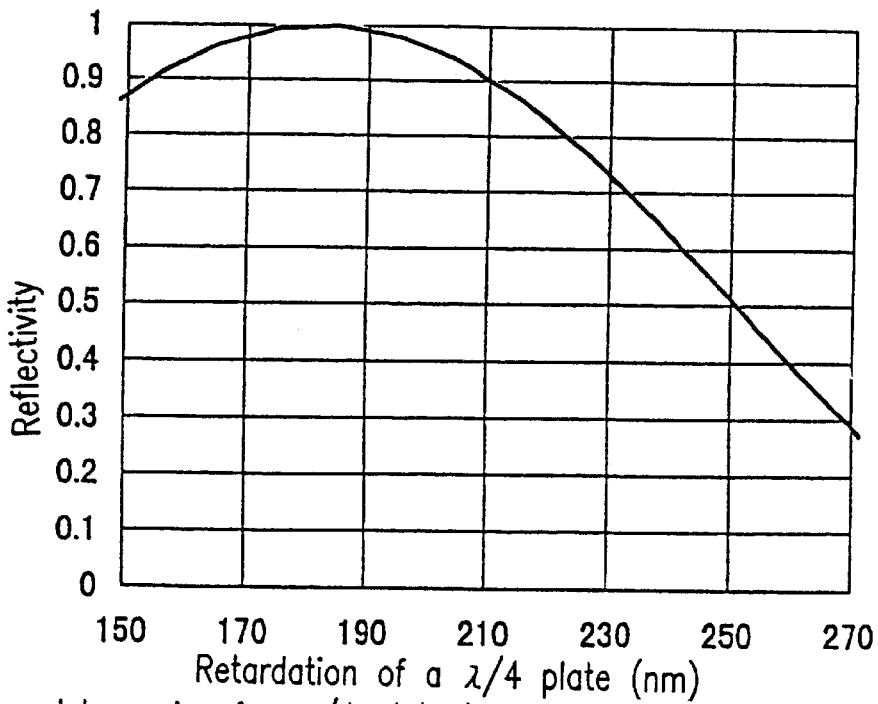

Next, FIGS. 15A and 15B respectively show a relationship between the retardation Rd and the reflectivity of the quarter-wave plate 170b (FIG. 4) in the reflection region 120R, where a cell gap dr of the liquid crystal layer 140 in the reflection region 120R is about 3.0 μm, a twist angle $\theta_r$ of the liquid crystal layer 140 is about 0°, and a liquid crystal material having positive dielectric anisotropy with refractive index anisotropy Δn of about 0.06 is used for the liquid crystal layer 140. FIG. 15A shows the case where the phase-delay axis of the quarter-wave plate 170b is provided in a direction parallel to the phase-delay axis of the liquid crystal layer 140. FIG. 15B shows the case where the phase-delay axis of the quarter-wave plate 170b is provided in a direction vertical to the phase-delay axis of the liquid crystal layer 140. This study is conducted at a wavelength of about 550 nm at which visibility becomes maximum with respect to light.

In a liquid crystal display device of a normally white mode, it is preferable that brightness in the absence of an applied voltage is about 50% or more with respect to ideal reflectivity. Thus, it is understood from FIGS. 15A and 15B that the retardation Rd of the phase difference plate 170b is in a range of about 30 nm to about 250 nm. The reasons for this will be described below.

Figure 17:
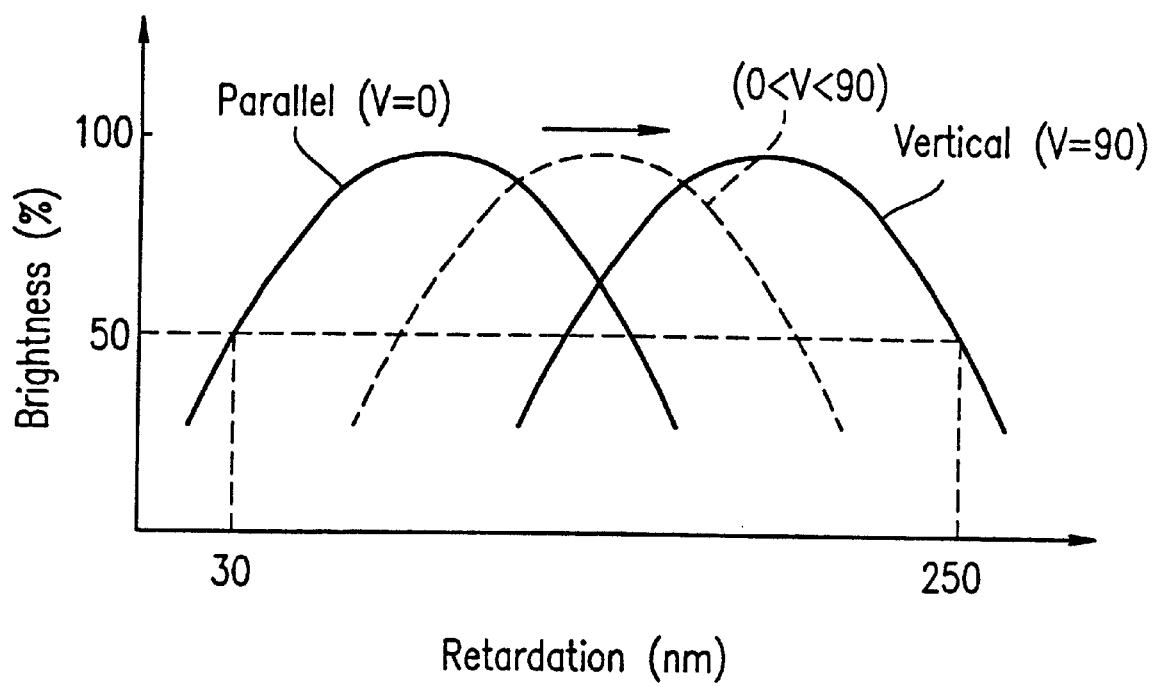
FIG. 17 is a graph showing a relationship between set angles of a phase-delay axis of a phase difference plate and a phase-delay axis of a liquid crystal phase, the retardation of the phase difference plate, and the brightness (reflectivity) of the phase difference plate.

FIG. 17 shows a relationship between the setting angle V of the phase-delay axis of the phase difference plate and the phase-delay axis of the liquid crystal layer, the retardation of the phase-difference plate, and the brightness (reflectivity). It is assumed that ideal reflectivity is 100%. Concave curves are present at each setting angle (0≦V≦90). The curve shifts in the right direction (positive direction in an X-axis) when the setting angle V is increased. The lower limit value of the optimum retardation is determined when the phase-delay axis of the quarter-wave plate 170b is provided in a direction parallel to the phase-delay axis of the liquid crystal layer 140 (i.e., V=0). The upper limit value of the optimum retardation is determined when the phase-delay axis of the quarter-wave plate 170b is provided in a direction vertical to the phase-delay axis of the liquid crystal layer 140 (i.e., V=90). The respective results are shown in FIGS. 15A and 15B.

More specifically, as long as the retardation of the phase difference plate is in a range of about 30 nm to about 250 nm, by setting the phase-delay axis of the phase difference plate and the phase-delay axis of the liquid crystal layer at an appropriate angle, satisfactory white display and black display are realized. In other words, if the retardation is less than about 30 nm or more than about 250 nm, a satisfactory white display cannot be obtained no matter how the setting angle V is adjusted.

Figure 15C:
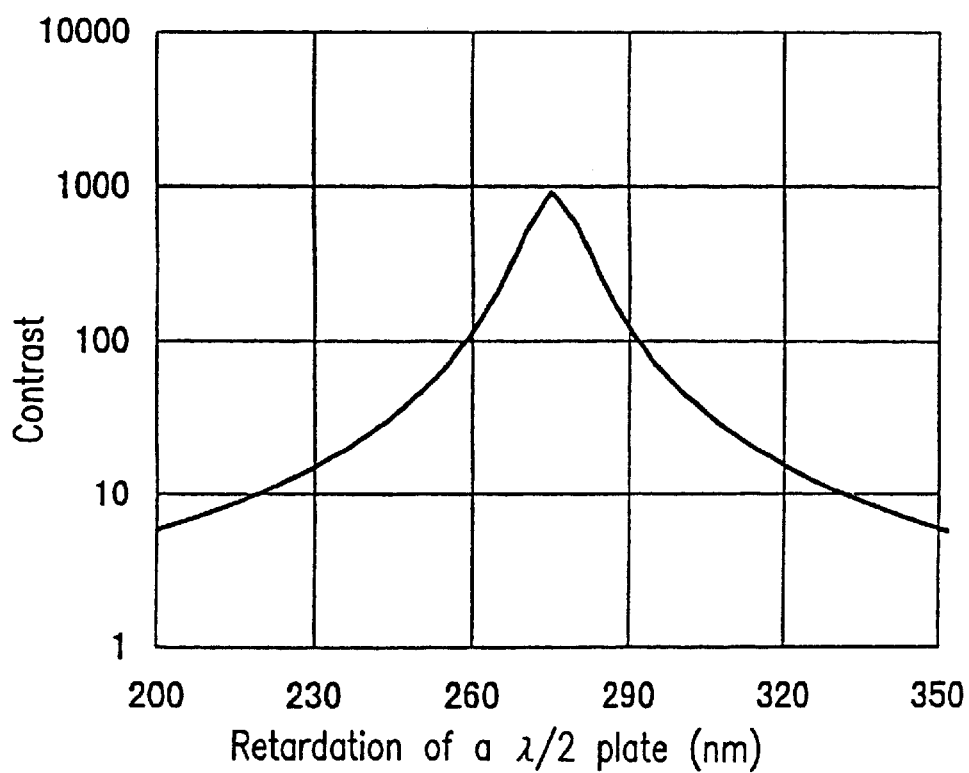
FIG. 15C is a graph showing a relationship between the retardation and the contrast of a half-wave plate in the reflection region.

In order to enhance a contrast ratio, it is preferable that another phase difference plate is provided. Therefore, the half-wave plate 170a is inserted between the phase difference plate 170b and the polarizing plate 172. FIG. 15C shows a relationship between the retardation Rd of the half-wave plate 170a and the contrast ratio in the reflection region 120R. The contrast ratio is studied at a wavelength in a range of about 380 nm to about 780 nm, considering visibility. Thus, the results as shown in FIG. 15C are obtained.

If visibility is considered, it is preferable that the contrast ratio in the reflection type liquid crystal display device is about 10 or more. Thus, it is understood from FIG. 15C that the retardation Rd of the half-wave plate 170a is in a range of about 220 nm to about 330 nm.

Figure 16A:
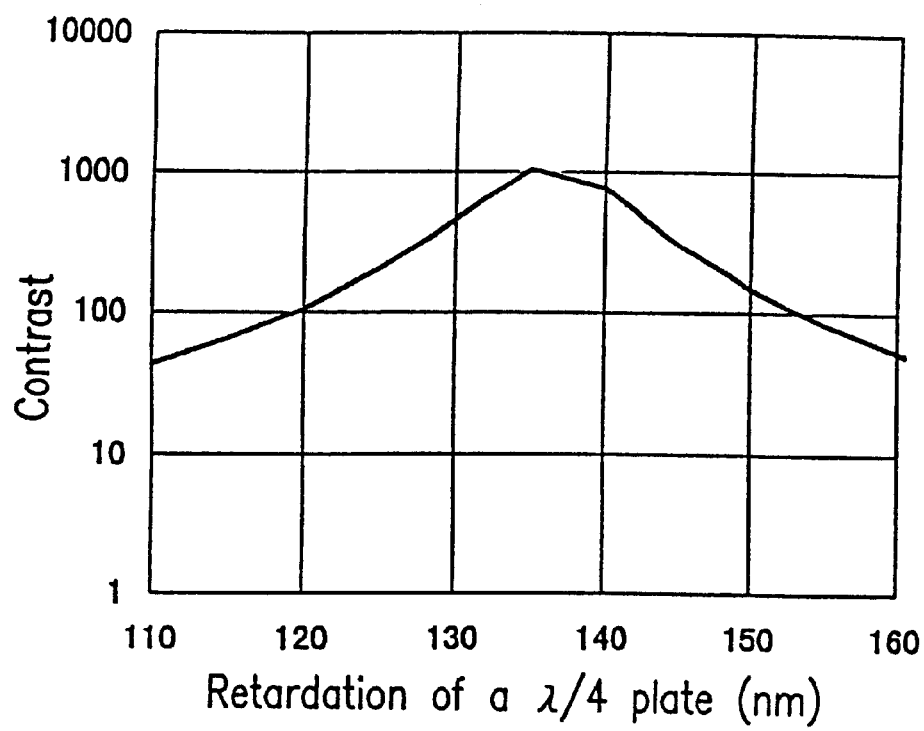
FIG. 16A is a graph showing a relationship between the retardation and the contrast of a quarter-wave plate in a transmission region.

After preferentially setting the reflection region 120R as described above, a display quality in the transmission region 120T in the device is further studied. FIG. 16A shows a relationship between the retardation Rd of the quarter-wave plate 180a (FIG. 4) and the contrast ratio, where a cell gap dt of the liquid crystal layer 140 in the transmission region 120T is about 5.5 μm, a twist angle $\theta_t$ of the liquid crystal layer 140 is about 0°, and a liquid crystal material having positive dielectric anisotropy with refractive index anisotropy Δn of about 0.06 is used for the liquid crystal layer 140. The results of the contrast ratio shown in FIG. 16A are obtained in the same way as in the reflection region 120R.

If visibility is considered, it is preferable that the contrast ratio in the transmission type liquid crystal display device is about 10 or more. Thus, it is understood from FIG. 16A that the retardation of the phase difference plate 180a is set in a range of about 120 nm to about 150 nm.

Figure 16B:
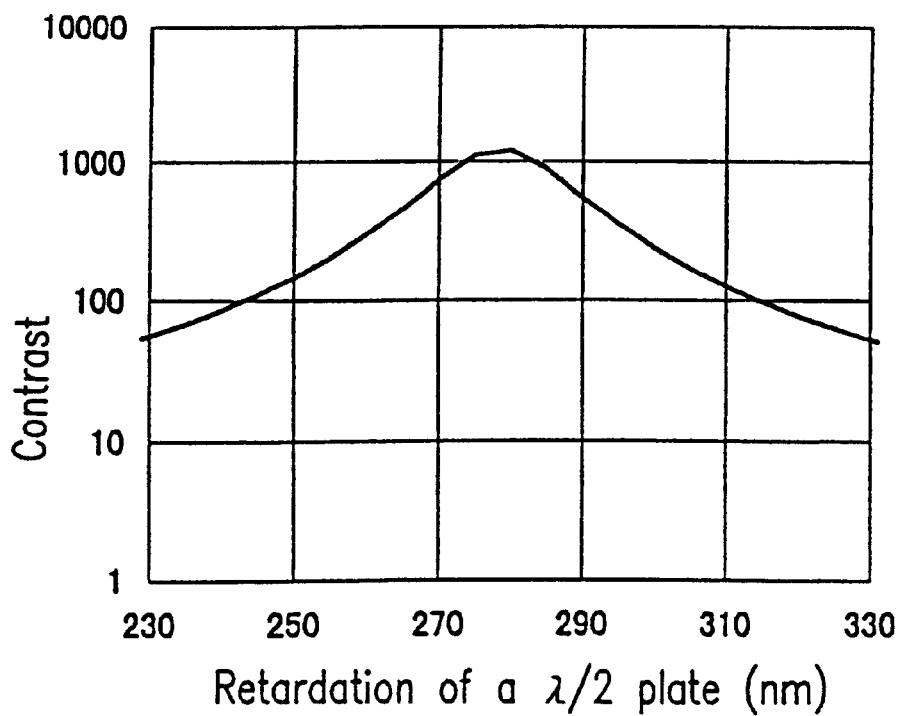
FIG. 16B is a graph showing a relationship between the retardation and the contrast of a half-wave plate in a transmission region.

In order to further enhance the contrast ratio in the transmission region 120T, it is preferable that the half-wave plate 180b for compensating for color is inserted between the quarter-wave plate 180a and the polarizing plate 182 (between the polarization axis of linearly polarized light output from the quarter-wave plate 180a and the polarization axis of the polarizing plate 182). It is understood from FIG. 16B which shows a relationship between the retardation Rd of the half-wave plate 180b and the contrast ratio that the retardation of the half-wave plate 180b is set in a range of about 240 nm to about 310 nm so that the contrast ratio satisfies about 100 or more.

As described above, as long as the twist angle of liquid crystal molecules is 0°, even if there is a difference in the cell thickness in pixel regions, disclination lines are unlikely to be formed, and the liquid crystal molecules are satisfactorily aligned. Thus, by setting the retardation of the liquid crystal layer and the retardation of four kinds of phase difference plates 170a, 170b, 180a, and 180b under the condition that the twist angle of the liquid crystal layer is 0°, respective display characteristics in a reflection mode and in a transmission mode of the liquid crystal display device can be most enhanced. The phase difference plates 170b, 170a, 180a, and 180b preferentially contribute to display characteristics in this order. Thus, the phase difference plate 170b is the most important component. As is understood from this preferential order, it is preferable that a display in a reflection mode is preferentially enhanced.

As described above, according to the present invention, a display with a high contrast is made possible in a liquid crystal display device which is capable of functioning both in a reflection mode and a transmission mode. Furthermore, a black display can also be performed when both a reflection mode and a transmission mode are used. Therefore, a display with a high contrast can be performed even when both a reflection mode and a transmission mode are used. Furthermore, a gray-scale display from a white display to a black display is made possible by changing an applied voltage to alter a retardation value of the liquid crystal layer. Furthermore, since retardation in the liquid crystal layer can be optimized independently in the reflection region and the transmission region, the liquid crystal layer can be driven with the same voltage in the transmission region and the reflection region. This allows a display in a reflection mode and a display in a transmission mode to be performed with the same driving without being affected by ambient environment. Thus, it is not required to switch a display mode depending upon ambient environment.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising: a first substrate, a second substrate, a liquid crystal layer interposed between the first substrate and the second substrate, and a plurality of pixel regions defined by a pair of electrodes for applying a voltage to the liquid crystal layer, wherein each of the plurality of pixel regions includes a reflection region and a transmission region, and the liquid crystal layer is made of a liquid crystal material having positive dielectric anisotropy, the device further including:
a first polarizing element provided on the first substrate opposite to the liquid crystal layer;
a second polarizing element provided on the second substrate opposite to the liquid crystal layer;
a first phase difference compensator provided between the first polarizing element and the liquid crystal layer; and
a second phase difference compensator provided between the second polarizing element and the liquid crystal layer,
a twist angle $\theta_t$ of the liquid crystal layer being in a range of 0° to 90°,
wherein retardation Rd and the twist angle $\theta_t$ in a visible light region of the liquid crystal layer in the reflection region are in ranges within curves respectively represented by the following Formulae (1) and (2), and Formulae (3) and (4), in ranges within curves respectively represented by the following Formulae (5) and (6) and Formulae (7) and (8) at the twist angle $\theta_t$ in a range of $0° \leq \theta_t \leq 54.3°$, and in ranges within curves respectively represented by the following Formulae (5) and (8) at the twist angle $\theta_t$ in a range of $54.3° < \theta_t \leq 90°$, and
wherein the retardation Rd and the twist angle $\theta_t$ in a visible light region of the liquid crystal layer in the transmission region are in ranges within curves respectively represented by the following Formulae (9) and (10) and Formulae (11) and (12):

$$Rd = -0.0043 \cdot \theta_t^2 - 0.065 \cdot \theta_t + 1011.8 \tag{1}$$

$$Rd = -0.0089 \cdot \theta_t^2 + 0.1379 \cdot \theta_t + 914.68 \tag{2}$$

$$Rd = -0.0015 \cdot \theta_t^2 - 0.1612 \cdot \theta_t + 737.29 \tag{3}$$

$$Rd = -0.0064 \cdot \theta_t^2 - 0.0043 \cdot \theta_t + 640.65 \tag{4}$$

$$Rd = -0.0178 \cdot \theta_t^2 + 0.2219 \cdot \theta_t + 458.92 \tag{5}$$

$$Rd = -0.0405 \cdot \theta_t^2 + 0.4045 \cdot \theta_t + 364.05 \tag{6}$$

$$Rd = 0.0347 \cdot \theta_t^2 - 0.4161 \cdot \theta_t + 186.53 \tag{7}$$

$$Rd = 0.0098 \cdot \theta_t^2 - 0.1912 \cdot \theta_t + 89.873 \tag{8}$$

$$Rd = -0.0043 \cdot \theta_t^2 - 0.065 \cdot \theta_t + 995.66 \tag{9}$$

$$Rd = -0.0058 \cdot \theta_t^2 - 0.0202 \cdot \theta_t + 665.8 \tag{10}$$

$$Rd = -0.0248 \cdot \theta_t^2 + 0.6307 \cdot \theta_t + 439.58 \tag{11}$$

$$Rd = 0.0181 \cdot \theta_t^2 - 0.6662 \cdot \theta_t + 109.51 \tag{12}$$

2. A liquid crystal display device according to claim 1, wherein the retardation Rd is in a range within the curves respectively represented by Formulae (7) and (8) at the twist angle $\theta_t$ in the reflection region in a range of $0° \leq \theta_t \leq 54.3°$, and in a range within the curves respectively represented by Formulae (5) and (8) at the twist angle $\theta_t$ in the reflection region in a range of $54.3° < \theta_t \leq 90°$, and the retardation is in a range within the curves respectively represented by Formulae (11) and (12) at the twist angle $\theta_t$ in the transmission region in a range of $0° \leq \theta_t \leq 90°$.

3. A liquid crystal display device according to claim 1, wherein the reflection region and the transmission region include a liquid crystal layer made of the same liquid crystal material, and a thickness of the liquid crystal layer in the reflection region is smaller than a thickness of the liquid crystal layer in the transmission region.

4. A liquid crystal display device according to claim 2, wherein the first phase difference compensator has a first phase difference plate, the twist angle $\theta_t$ of the liquid crystal layer is 0°, the retardation Rd of the reflection region is 90 nm≦Rd≦187 nm, the retardation Rd of the transmission region is 110 nm≦Rd≦440 nm, and the retardation Rd of the first phase difference plate is 30 nm≦Rd≦250 nm.

5. A liquid crystal display device according to claim 4, wherein the first phase difference compensator further has a second phase difference plate, and the retardation Rd of the second phase difference plate is in a range of 220 nm≦Rd≦330 nm.

6. A liquid crystal display device according to claim 5, wherein the second phase difference compensator has a third phase difference plate, and the retardation Rd of the third phase difference plate is in a range of 120 nm≦Rd≦150 nm.

7. A liquid crystal display device according to claim 6, wherein the second phase difference compensator further has a fourth phase difference plate, and the retardation Rd of the fourth phase difference plate is in a range of 240 nm≦Rd≦310 nm.

* * * * *